(12) United States Patent
Freeman et al.

(10) Patent No.: US 6,402,824 B1
(45) Date of Patent: Jun. 11, 2002

(54) PROCESSES FOR PREPARING PRECIPITATED CALCIUM CARBONATE COMPOSITIONS AND THE PRODUCTS THEREOF

(75) Inventors: Gary M. Freeman, Macon; Randal A. Moritz; William J. Jones, both of Lizella; Kurt H. Moller, Warner Robins, all of GA (US)

(73) Assignee: J. M. Huber Corporation, Edison, NJ (US)

( * ) Notice: Subject to any disclaimer, the term of this patent is extended or adjusted under 35 U.S.C. 154(b) by 0 days.

(21) Appl. No.: 09/578,470

(22) Filed: May 26, 2000

(51) Int. Cl.$^7$ .................................................. C09C 1/02
(52) U.S. Cl. ........................ 106/464; 106/465; 423/430; 423/432
(58) Field of Search ................................ 106/464, 465; 423/430, 432

(56) References Cited

U.S. PATENT DOCUMENTS

| | | | |
|---|---|---|---|
| 3,486,740 A | 12/1969 | Christian | 259/2 |
| 4,687,546 A | 8/1987 | Willis | 159/2.1 |
| 4,732,748 A | 3/1988 | Stewart et al. | 423/430 |
| 5,036,599 A | 8/1991 | Thompson | 34/5 |
| 5,160,454 A | 11/1992 | Knudsen, Jr. et al. | 252/315.2 |
| 5,248,387 A | 9/1993 | Hansen | 159/48.1 |
| 5,292,365 A | 3/1994 | Delfosse | 106/464 |
| 5,643,631 A | 7/1997 | Donigian et al. | 427/218 |
| 5,704,556 A | 1/1998 | McLaughlin | 241/21 |
| 5,730,836 A | 3/1998 | Greig et al. | 159/2.3 |
| 5,833,747 A | 11/1998 | Bleakley et al. | 106/464 |
| 5,879,442 A | 3/1999 | Nishiguchi et al. | 106/464 |
| 6,143,065 A | * 11/2000 | Freeman et al. | 106/464 |

FOREIGN PATENT DOCUMENTS

| | | | |
|---|---|---|---|
| WO | WO 99/51525 | 10/1999 | C01F/11/18 |

OTHER PUBLICATIONS

Wojcik, J., et al., Particle disruption of precipitated CaCo$_3$ crystal agglomerates in turbulently agitated suspensions, Chem. Eng. Sci., vol. 53, No. 5, 1998 (no month), pp. 1097–1101.

Gill, R., "Precipitated CaCO$_3$ Fillers for Papermaking", Pigm. Pap., TAPPI Press, Atlanta, Ga., 1997 (no month), pp. 119–137.

Kyosai, S., et al., "Lime Precipitation and Recovery of Calcium Carbonate", Proc.–U.S./Jpn. Conf. sewage Treat. Technol., 4$^{th}$, Sep. 1976, pp. 205–226.

Charles Ross and Son Company, "Installation, Maintenance and Operating Manual—ME–410/420X In–Line Mixer/Emulsifier", Charles Ross and Son Company Hauppauge, NY, 1997 (no month), pp. 1, 5–35 (+ pg. appendix).

* cited by examiner

*Primary Examiner*—Michael Marcheschi
(74) *Attorney, Agent, or Firm*—Carlos Nieves

(57) ABSTRACT

Processes for making high quality PCC compositions, and the resulting PCC products thereof. A precipitated calcium carbonate (PCC) composition is prepared by a process comprising the step of wet media mill grinding an aqueous slurry of PCC made by carbonation of lime milk, with the grinding being done at a low solids content in a plurality of separate grinding stages, which can done while essentially free of the presence of organic dispersant. After the multi-stage wet grinding step, the ground PCC slurry is partially dewatered in the presence of an organic dispersant in a solid bowl centrifuge. Then, the partially dewatered PCC slurry is subjected, in the presence of an organic dispersant, to fluid shearing forces created in a rotor/stator type mixer. While these three steps are advantageously used together within a single PCC process flow for optimal effect, the individual steps also can be incorporated singly or in lesser combinations thereof into different PCC manufacturing schemes to beneficial effect. The resulting PCC compositions are endowed with reduced high-shear viscosity in aqueous slurry form at high solids content and contain PCC particles of narrower particle size distribution. PCC slurries are provided that are particularly well-suited for paper coatings applications including medium and low coating weight, woodfree paper coatings, although it has wider applicability and is by no means limited thereto. As another aspect, the additional cost otherwise associated with the use of evaporative-based dehydration procedures to increase the PCC solids content in a PCC slurry or associated with the adding of dry CaCO$_3$ pigment to build slurry solids can be reduced or even eliminated by a facile made in a decanting operation within the inventive process flow.

23 Claims, 9 Drawing Sheets

PROCESSES FOR PREPARING PRECIPITATED CALCIUM CARBONATE COMPOSITIONS AND THE PRODUCTS THEREOF

BACKGROUND OF THE INVENTION

1. Field of the Invention

This invention relates to the preparation of precipitated calcium carbonate (PCC) compositions and the resulting PCC composition products. More particularly, the invention relates to the preparation of precipitated calcium carbonate (PCC) compositions having reduced high-shear viscosity in aqueous slurry form, and containing PCC particles of narrower particle size distribution, while reducing requirements for relatively cost-intensive preparation steps such as evaporative-based dehydration procedures. The precipitated calcium carbonate composition products prepared by the invention are especially useful as a paper coating pigment and filler, among other things.

2. Description of the Related Art

Precipitated calcium carbonate is an extremely versatile coating aid, filler and pigment that is employed in a wide variety of commercial products including paper, paint, plastics, rubber, textiles, and printing inks. Precipitated calcium carbonate (PCC) is used on a large scale in paper filling and coating applications in particular. PCC is utilized to increase the opacity and brightness of paper, among other things. In addition to enhancing the opacifying and brightening characteristics of paper, PCC also imparts a high resistance to yellowing and aging of the paper. PCC offers cost advantages over other conventional additives used for increasing the opacity and brightness of paper, such as calcined clay or titanium dioxide.

As a practical matter, many contemporary paper coating machines operate at high running velocities, in which the paper coating composition is applied to a side of running base paper stock using a blade coater. As a consequence, the paper coating composition encounters high shearing forces during such blade coating, making it desirable to have a paper coating composition that displays low viscosity at high shear conditions so that it is sufficiently flowable to form a thin uniform coating when applied to paper base stock. An impediment to achieving such high-speed flowability is that paper coating compositions must employ a relatively high solids content in order to hold down the coating drying requirements, which tends to generally increase the viscosity. For instance, paper coating compositions comprised of aqueous slurries containing PCC have about 70 wt % or higher total solids content. However, once coated upon base paper, a paper coating composition needs to be relatively immobile so that it does not run or wick, to preserve the uniformly applied coating. Thus, it is also desirable that the paper coating composition be able to assume a relatively higher viscosity behavior immediately upon emerging from the high shear conditions associated with the blade coating. Thus, a challenge has existed to impart a stable, pseudoplastic-like rheological character in a paper coating slurry composition, as opposed to dilatant behavior, as those terms are customarily defined for non-Newtonian fluids. Namely, the apparent viscosity of a pseudo-plastic fluid material decreases with increasing shear rate, which is opposite to rheological behavior of a dilatant fluid material which has an apparent viscosity that increases with increasing shear rate. Moreover, the pursuit of the desired pseudo-plastic like rheological character for paper coating compositions cannot come at the expense of the light scattering properties required of the PCC. Ideally, enhancements to the optical performance properties of the PCC somehow would be provided together with the desired rheological improvements all in a single PCC containing composition.

The prior art has proposed manipulating the preparation procedures used to make PCC slurries in efforts to improve the ultimate properties of the resulting PCC composition used in paper coating applications. For example, U.S. Pat. No. 5,833,747 to Bleakley et al. describes a process scheme for making paper coating pigments in which a slurry of PCC particle aggregates made by carbonation of milk of lime is subjected to the steps of partial dewatering using a tube pressure filter in conjunction with a separate comminution step using a single pass attrition grinding mill fitted with a 250 horsepower (186 kW) motor and containing silica sand as grinding media such that at least 100 kW-hr of energy per dry ton of PCC is dissipated in the PCC suspension (where the sequence of the partial dewatering and comminution steps optionally can be switched). Bleakley et al. describe a PCC product provided having a particle size distribution such that 70% of the particles have an equivalent spherical diameter of less one micrometer and at least 50 percent of the particles have an equivalent spherical diameter of less than 0.5 micrometers.

U.S. Pat. No. 5,879,442 to Nishiguchi et al. teaches a method for making an aqueous slurry of PCC suitable for paper coating compositions in which a PCC slurry is subjected to a primary dispersion in the presence of a viscosity reducing agent using a mixer such as "Cowles" type mixers and agitating dispersers; and then dry ground calcium carbonate is added and the resulting slurry subjected to mixing again with "Cowles" type mixers and agitating dispersers as a secondary dispersing treatment; followed by a tertiary dispersing treatment in which the calcium carbonate slurry is subjected to a sand grinding treatment, preferably using 2–4 runs of the sand grinding treatment and also with admixture of a viscosity-reducing agent. The method described in U.S. Pat. No. 5,879,442 is used to provide an aqueous slurry of calcium carbonate particles (70 to 85 total wt % calcium carbonate) having a median particle size of 0.2 to 2.0 $\mu$m and a specific surface area of ranging from 5 to 25 $m^2/g$, and the slurry has a viscosity not exceeding 1000 cP at 25° C. and a high shear viscosity not exceeding 200 cP at 25° C.

A need has existed for development of even higher quality aqueous slurries of PCC suitable for paper coating applications which can be made in a cost effective manner.

SUMMARY OF THE INVENTION

The present invention achieves the above and other objectives by providing a unique approach to preparing PCC compositions such that the resulting PCC compositions are endowed with reduced high-shear viscosity in aqueous slurry form at high solids content and contain PCC particles of narrower particle size distribution. As another aspect of the invention, the additional cost otherwise associated with the use of evaporative-based dehydration procedures to increase the PCC solids content in a PCC slurry or associated with the adding of dry $CaCO_3$ pigment to build slurry solids can be reduced or even eliminated by a facile inventive modification made in a decanting operation within the process flow according to this invention. The present invention is particularly well-suited for providing PCC slurries useful for paper coatings applications including medium and low coating weight, woodfree paper coatings, although it has wider applicability and is by no means limited thereto.

As a general embodiment of the invention, there is a process for the preparation of a precipitated calcium carbonate (PCC) composition, comprising the step of wet media mill grinding an aqueous slurry of PCC made by carbonation of lime milk, with the grinding being done at a low solids content in a plurality of separate grinding stages while essentially free of the presence of organic dispersant. After the multi-stage wet grinding step, the ground PCC slurry is partially dewatered in the presence of an organic dispersant in a solid bowl centrifuge. Then, the partially dewatered PCC slurry is subjected, in the presence of an organic dispersant, to fluid shearing forces created in a rotor/stator type mixer. While these three steps are advantageously used together within a single PCC process flow for optimal effect, the individual steps also can be incorporated singly or in lesser combinations thereof into different PCC manufacturing schemes to beneficial effect.

In one aspect of the invention, PCC particles in a crude, synthesized PCC slurry of relatively low solids content (e.g., 15–25 wt % PCC) are subjected to multi-stage wet media grinding (including a multi-pass mode through a single mill or conducting the slurry through a series of separate mills). It has been discovered that it is possible to mill the PCC particles in this manner at a relatively low ratio value of starting PCC particles relative to the number of milling media particles (i.e., the "P/M particle ratio") present in the mill grinding runs and while free or essentially free of the presence of organic dispersant so as to achieve a significantly enhanced (narrower) particle size distribution (i.e., reduced slope) as compared to PCC particles subjected to comminution in a single, high energy milling pass and/or as done in high solids content (e.g, >50 wt % solids) environments in the presence of an organic dispersant. The use of multi-stage grinding serves to compensate for the longer residence time otherwise associated with milling at the aforesaid low ratio value of PCC particles/media particles according to this embodiment of the invention. The aforesaid milling conditions of this embodiment of the invention provide a comminution in which agglomerates of primary PCC particles that typically arise during the prior synthesis of the PCC are effectively broken-up, but without grinding the liberated primary particles to form a quantity of fines and ultrafines that would undesirably broaden the particle size distribution. The narrower particle size distribution achieved by this embodiment of the invention translates into improved brightness and opacity effects for paper coating applications because of the less efficient pigment particle packing that is obtained given the general absence of fine particles. The terminology "essentially free" means that if any organic dispersing agent is present at the time of the grinding that it is present only in such scant benign amounts that the 75/25 slope value, defined herein, can still be lowered below 1.8 by the inventive processing. In no event is any amount of organic dispersant present during the wet media milling step that is equal or greater than 0.01 wt % based on the dry weight of calcium carbonate in the slurry at that point. The median particle size of the PCC particles of the high solids content PCC slurries obtained by processing according to this invention generally will be in range of approximately 0.25 to 2.0 μm, and more typically between approximately 0.5 to 1.0 μm, and within a relatively narrow size distribution as defined by a slope (steepness factor) of less than approximately 1.8, and more preferably less than approximately 1.75. The "slope", as that term is used in this invention, means the quotient value of the diameter value for which 75% of the particles are less than (as the numerator), divided by the diameter value for which 25% of the particles are less than (as the denominator), where the particle sizes are measured by a Sedigraph Particle Size Analyzer. Indeed, even smaller slope values between 1.6 to 1.7 are routinely achievable by the present invention. The PCC slurries fed to the inventive multi-pass wet media grinding procedure can be freshly made precipitated PCC slurries, or non-treated (i.e., non-dispersed, non-comminuted, non-dewatered) raw PCC slurries that have been previously made, stored and supplied, such as applicable commercially available coarse grade PCC slurries.

In another aspect of the invention, it has been discovered that the PCC slurries that are subjected to the solid bowl centrifuging step in a dispersed state according to another step of the invention achieve such extensive dewatering that the resulting high solids content of the partly dewatered PCC slurry (viz., up to about 75 wt % solids) permits reductions in demands for, if not permitting complete elimination of, separate cost-intensive evaporative dehydration procedures in the process flow.

In yet another aspect of the invention, it has been discovered that high solids content PCC slurries, such as those that are greater than 70% solids by weight, can be subjected to a high shear in-line mixing step performed using a rotor and stator mixer so as to impart a reduced high shear viscosity property, yet without sacrificing favorable particle distribution and median particle size properties of the treated PCC particles (such as imparted in a preceding multi-stage milling step per another aspect of this invention). For example, a high solids content PCC slurry subjected to the high shear, in-line mixing via a rotor and stator mixer according to this step of the inventive process can achieve a Hercules shear viscosity of 18+ dynes at 935 rpm (A-bob @ 100 rpm) indicative of high shear flowability.

Consequently, the aqueous PCC slurries prepared by this invention are quite useful for paper coating applications as they yield a coating color for paper that has excellent high-shear flowability under an applicator blade to permit uniform coatings to be applied to fast running paper webs, yet have reduced mobility after being coated such that it will not run or wick. A fine particle size precipitated calcium carbonate is provided (i.e., the median particle size <2 microns) within a narrow particle size distribution (i.e., at a slope <1.8). The high solids PCC slurries of this invention show significantly reduced dilatant rheological behavior as compared to PCC coating pigment slurries processed by conventional means. Moreover, the PCC slurries of this invention and paper coating compositions incorporating same have been observed to be rheologically stable over time.

PCC slurries comprised of calcitic crystal structures of PCC, and preferably rhombohedral shaped particle form, are preferably, although not exclusively, processed by this invention to provide high quality PCC slurries well-suited for use in paper coating applications. To best ensure the rheological stability, the PCC particles that are processed according to the invention preferably have a rhombohedral shaped calcitic crystal form.

DETAILED DESCRIPTION OF PREFERRED EMBODIMENTS

In accordance with the preceding summary, the present invention is directed toward a process flow for making aqueous PCC compositions, which embodies three subsidiary processing steps useful for treatment of precipitated calcium carbonate, which can be employed individually or in combination with one another in a PCC processing scheme, to enhance the PCC product and processing performance.

Figure 1:
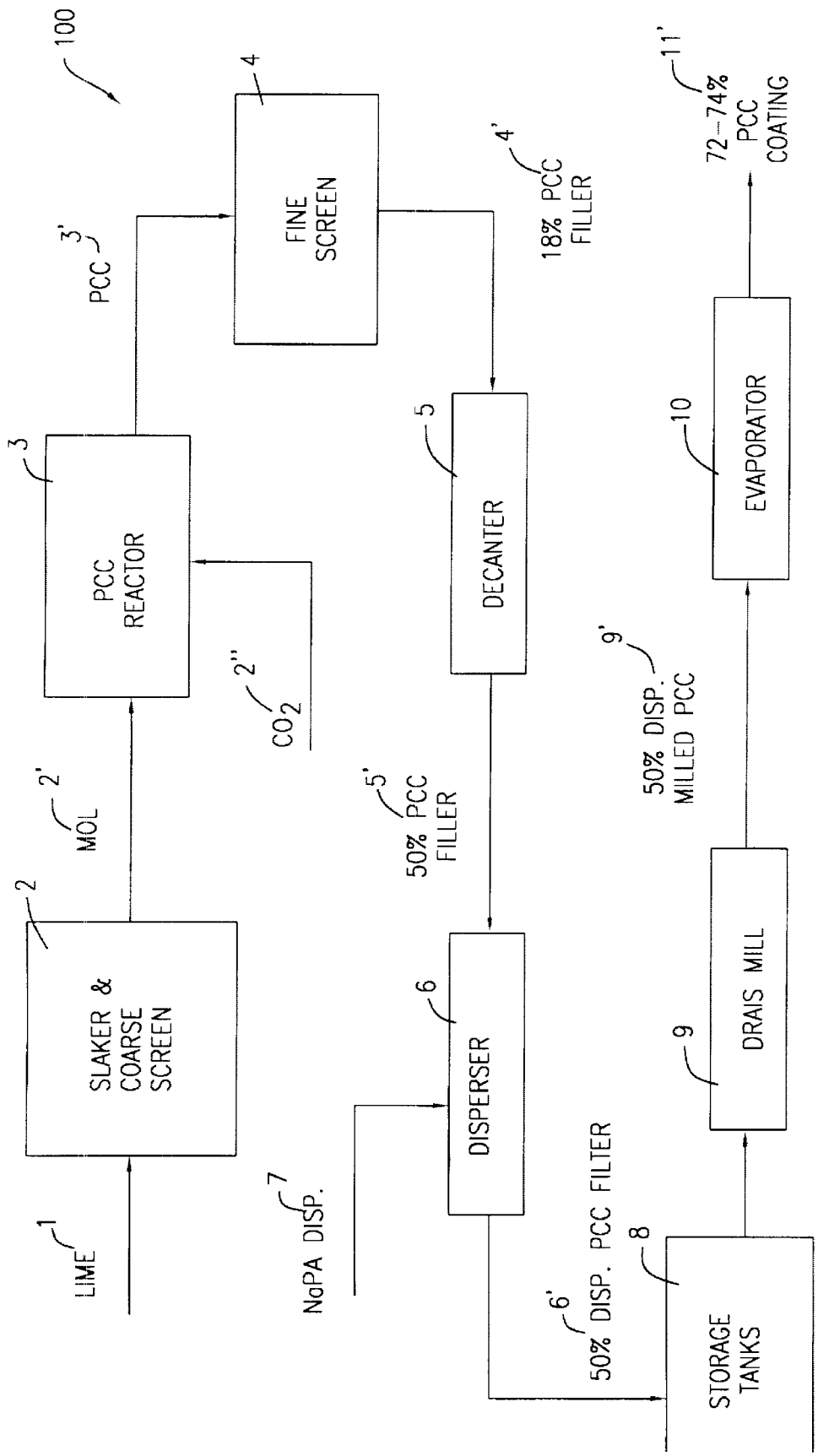
FIG. 1 shows a process flow chart of a comparative PCC slurry preparation and processing scheme.

FIG. 1 is representative of one generalized type of conventional process flow 100 for manufacture of PCC in aqueous slurry form at high solids content. Lime 1 is fed into a slaker 2 fitted with a coarse screen at its outlet to form an aqueous suspension of calcium hydroxide 2', i.e., milk of lime ("MOL") or lime milk for short. The MOL 2' is fed to a PCC reactor 3, e.g., a holding vessel equipped with baffles and an agitator of conventional design for this purpose (not shown). Carbon dioxide gas 2" or another suitable source of carbonation is fed into the PCC reactor 3 and mixed with the MOL 2' under PCC-forming reaction conditions, such as temperature, pH and time conditions, appropriately controlled to form the desired PCC crystal forms and particle types. As generally appreciated, in typical PCC forming chemistry, burnt lime (calcium oxide) first is slaked by the addition of water to form an aqueous slurry of calcium hydroxide. This calcium hydroxide is then reacted with carbon dioxide to precipitate calcium carbonate at approximately 16–22% solids. Continuing with reference to FIG. 1, the precipitated calcium carbonate slurry 3' is withdrawn from the reactor 3 and fed through a fine screen 4 sized to remove grit, providing an approximately 18–20 wt % PCC slurry 4' ready for post-processing. Dewatering is performed in a decanter 5, such as a wet centrifugal classifier, or alternatively with a vacuum filter, or other conventional dehydrating machine used for this purpose, to provide about a 50 wt % PCC slurry 5'. In conventional practice, the precipitated calcium carbonate is de-watered without the use of any organic dispersant when a solid bowl decanter is used (i.e., a decanting centrifuge) to provide approximately 50% solids. Partly dewatered slurry 5', in turn, is fed to a disperser 6 in which an effective amount of an organic dispersing aid 7, such as sodium polyacrylate 7, is combined with mixing. For example, sodium polyacrylate dispersant is added to the 50 wt % solids PCC slurry where after the dispersed PCC slurry 6' is stored in tanks 8, if necessary or desired, and then it is fed to a fine wet media grinding machine 9 for performing fine wet grinding (deagglomeration) of the dispersed PCC slurry. In being passed through a Drais horizontal bead mill or equivalent 9, the conventional PCC product is typically ground to a median particle size of 0.5–0.8 $\mu$m with a 75/25 slope value of 1.75 to 2.0 or above. At this point, the approximately 50 wt % solids milled PCC slurry 9' is fluidly conducted to an evaporator 10 to effectuate needed further dewatering to achieve a solids content in the PCC slurry product 11 of about 72–74 wt %.

Figure 2:
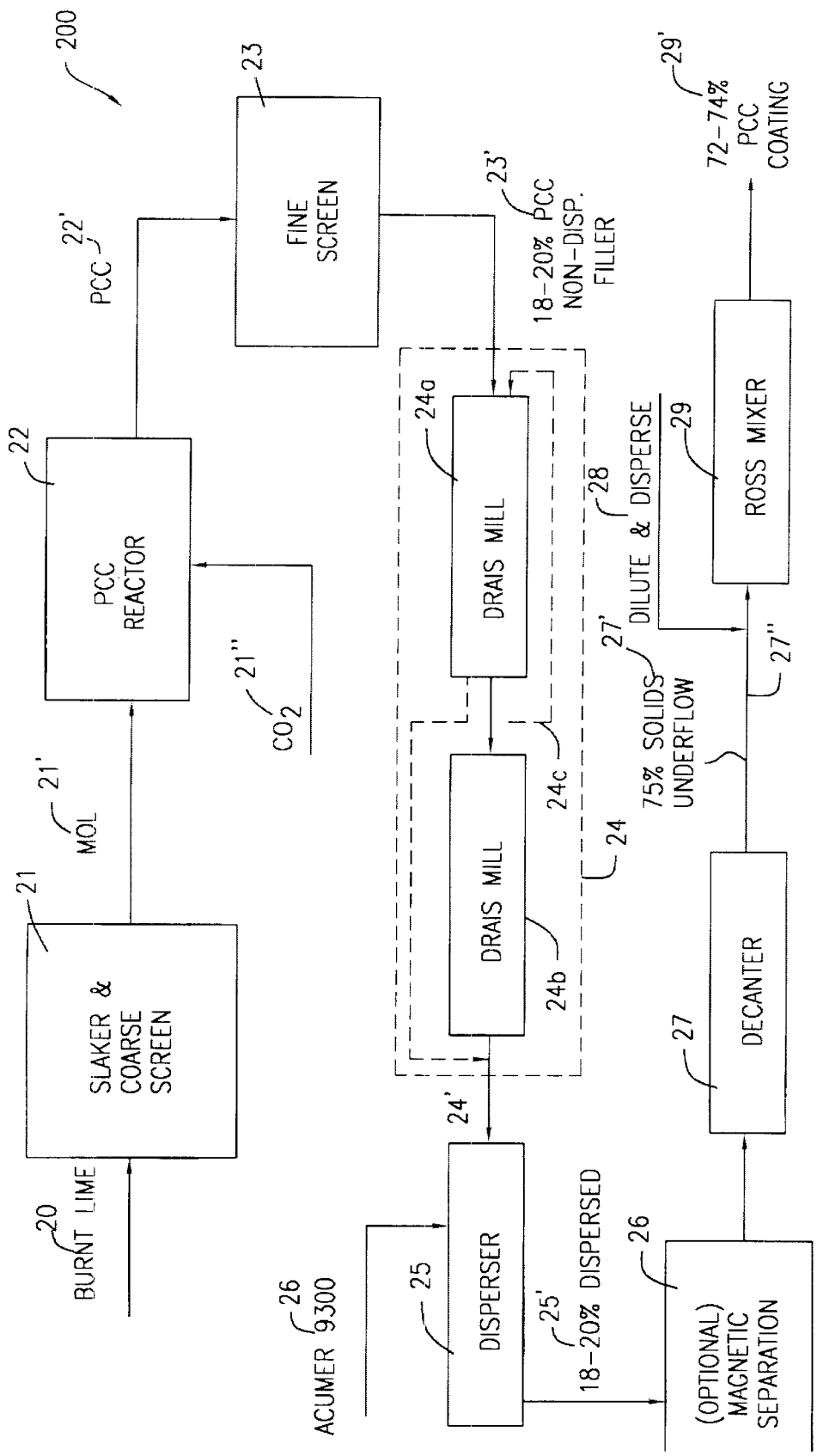
FIG. 2 shows a process flow chart of an embodiment of the inventive PCC slurry preparation and processing scheme.

By contrast, FIG. 2 is representative of one illustrative, non-limiting embodiment of the present inventive process flow 200 used for manufacture of a coating PCC in aqueous slurry form at high solids content. Lime 20 is fed into a slaker 21 fitted with a coarse screen at its outlet to form an aqueous suspension of calcium hydroxide 21', i.e., the MOL or lime milk. The MOL 21' is fed to a PCC reactor 22, which can be similar in basic structure to that described for FIG. 1. Carbon dioxide 21" is fed into the PCC reactor 22 and mixed with the MOL 21' under PCC-forming reaction conditions, such as temperature, pH and time conditions, appropriately controlled to form the desired PCC crystal and particle types.

The coarse, freshly reacted PCC slurry 22' (FIG. 2) that is post-processed using the new procedures described herein can be made according to conventional reaction chemistries therefor, such as those described above. A wide variety of calcium carbonate morphologies and particle sizes can be chemically produced via the precipitation reaction by appropriately manipulating the process conditions. Calcium carbonate is commonly precipitated in the form of calcite, aragonite, or vaterite crystalline forms. Calcite crystals are typically either rhombohedral, prismatic or scalenohedral in shape, while the aragonite crystal form is acicular or needle-shaped. The PCC crystals can be aggregated into larger particles or be essentially non-aggregated depending on the precipitation reaction conditions and mechanical post-processing of the PCC particles. In this invention, calcite type crystals are preferred, and especially rhombohedral shapes, although the invention is not limited thereto and can also involve the production of scalenohedral shapes of calcite, or aragonite crystals of PCC. In general, the use of rhombohedral character crystal structures of PCC is often favored for paper coating applications since the aqueous PCC slurries prepared according to this invention have very good rheological and stability properties.

In any event, with these considerations taken into account, the precipitated calcium carbonate slurry 22' is then drawn from the reactor 22 and fed through a fine screen 23 sized to remove coarse product particles (viz., >325 $\mu$m) to provide an about 15–25 wt %, more usually about 18–20 wt %, PCC slurry 23' ready for post-processing according to the invention. Alternatively, the freshly reacted coarse PCC slurry 22' could instead be replaced by coarse PCC obtained from a commercial vendor in either slurried form or as dry particles that can be slurried for use in this invention. Without having an organic dispersant added, the low solids non-dispersed PCC slurry 23' is fed to a multi-stage fine wet media grinding station 24. The multi-stage wet media grinding station 24, in one embodiment, is comprised of at least two or more separate mills 24a, 24b. The amount of energy dissipated into the PCC slurry at each mill stage 24a and 24b, or in each pass through a single mill in a multi-pass form of multi-stage milling) generally is kept approximately the same. The number of separate mill stages can be two or more.

Alternatively, the multi-stage wet media grinding station 24 can be comprised of a single mill 24a in which the PCC slurry feed 23' is fed through the single mill 24a in multiple passes using recirculation 24c (as indicated with hatched lines in FIG. 2) before the resulting ground slurry 24' (as indicated with hatched lines in FIG. 2) of that milling approach is conducted to the disperser 25.

The wet media mill types used as the mill 24a or mills 24a and 24b described above in multi-stage grinding station 24 independently can be ball mills, wet vertical media mills, wet horizontal media mills and the like. One preferred type of wet grinding mill used in the practice of this invention is a Drais Mill manufactured by Draiswerke, Inc., Mahway, N.J. The Drais mill is a horizontal style media mill.

It surprisingly has been discovered, and verified by experimentation, that the 75/25 slope (particle size distribution) property of PCC can be significantly improved (i.e., achieve a narrower particle size distribution) if the PCC slurry is wet media milled in multiple stages at low solids content (e.g., 15–25 wt %) and at a relatively low ratio value of starting PCC particles to the number of milling media particles (i.e., the "P/M particle ratio") present in the mill grinding runs without the presence of an organic dispersant, as opposed to using a single, high energy pass and/or milling an organically dispersed slurry of PCC at high solids (e.g., 50 wt % solids or higher). The use of multi-stage grinding serves to compensate for the longer residence time otherwise associated with milling at the aforesaid low ratio value of PCC particles/media particles according to this embodiment of the invention. The aforesaid milling conditions of this embodiment of the invention effectively break-up agglomerates of primary PCC particles that typically arise during the prior synthesis of the PCC, but without grinding the primary particles to form a quantity of fines and ultrafines that would undesirably broaden the particle size distribution. Moreover, this improvement in slope is achieved using the non-dispersed, multi-stage wet media milling, without undesirably causing an increase in the high shear viscosity property of the PCC slurry when utilized in combination with the other inventive process steps. Consequently, this low solids, non-dispersed, multi-pass or multi-stage wet media mill grinding procedure yields fine, coating grade PCC products of improved particle size distribution (i.e., more narrow) as measured by the 75/25 slope value.

The particle size distribution, or "slope" for purposes of this disclosure, is defined as the quotient of the diameter value for which 75% of the particles are less than (as the numerator), divided by the diameter value for which 25% of the particles are less than (as the denominator), and with the particle sizes measured by a Micromeritics Sedigraph 5100 X-ray sedimentation type instrument, which uses Stokes Law in determining the equivalent spherical particle diameters. Hence, a PCC coating pigment that has 75% of its particles <0.85 microns and 25% of its particles <0.50 microns would therefore have a 75/25 slope value of 0.85/0.50=1.7.

For improved paper coating performance, a slope of less than 1.8, and more preferably less than 1.75, is desired.

Slope values as low as between 1.6 to 1.7 are achievable by the present invention. Namely, the slope is reduced from about 1.8–2.0 using a single pass grinding step to about 1.7 or lower using the inventive non-dispersed, multiple pass wet media grinding process. It is imperative that the desired slope improvements not be associated with sacrifices in high-shear viscosity of the slurry, and the present invention achieves that objective. This processing technique thus produces a superior PCC coating product having more value to the customer.

While not desiring to be bound to any particular theory at this time, it nonetheless is believed that the narrowed particle size distribution achieved by processing according to an aspect of this invention directly translates into increased paper brightness. More specifically, it is thought that the narrower particle size distribution (i.e., smaller slope) imparted to the PCC by the non-dispersed, multi-pass wet media grinding step according to the invention decreases the tightness of the particle packing achieved on a coated paper, which effectively increases the micro-void spaces available between particles. This proviso reduces the opportunity for smaller particles to fill in voids between relatively larger sized particles as would occur where a broader particle size distribution is involved. It is believed that the light scattering property of the coated paper is enhanced by increasing the number of micro-void spaces between particles. It is well known to those skilled in the art that the presence of such micro-voids act to increase the scattering of light thereby yielding opacity.

Returning to FIG. 2, the milled PCC slurry 24' is then fed to a conventional disperser 25 in which a small amount of an organic dispersant 26 is combined with mixing. The milled, and then dispersed slurry 25' is fed to a solid bowl centrifuge 27, preferably a Bird solid bowl centrifuge. Another surprising discovery of this invention is that the dewatering of the dispersed milled PCC slurry permits very high solids contents, as high as 75 wt % or more, to be achieved. These solids contents are high enough such that requirements for subjecting the PCC slurry to a separate evaporation operation using a costly evaporator can be reduced or even avoided.

The organic dispersant or dispersing agent incorporated into the PCC slurry fed to the solid bowl centrifuge may be present in an amount of from 0.01 to 2.0 wt %, and more specifically from 0.6 to 1.0 wt %, based on the dry weight of PCC present. The organic dispersant may be selected from the organic dispersants and dispersing aids generally known in the art for the dispersion of calcium carbonate. The dispersant may comprise for example a polycarboxylate which may be homopolymer or copolymer which contains a monomer unit comprising a vinyl or olefinic group, or a water soluble thereof (e.g., sodium polyacrylate). Examples of suitable monomers include acrylic acid, methacrylic acid, itaconic acid, maleic acid, fumaric acid, crotonic acid, maleic anhydride, hydroxyacrylic acid, and so forth. The number average molecular weight of the polycarboxylate typically is in the range of about 500 to 12,000, as measured by gel permeation chromatography. The dispersant can be a sodium polyacrylate, such as commercially available as COLLOID 211 manufactured by Vinings Industries Inc. of Marietta, Ga., or ACUMER 9300 manufactured by Rohm & Haas, Philadelphia Pa., or DISPEX 2695 dispersant available from Allied Colloids, Suffolk, Va. (e.g., added on a 0.8% active weight basis).

Experimentation has shown that when a 15–25 wt %, more typically 18–20 wt %, solids, deagglomerated and dispersed PCC slurry is fed to a solid bowl centrifuge, that de-watering to 70–80% solids can be achieved. In the absence of any chemical dispersant, the same 18–20% solids PCC slurry can only be dewatered to about 50% solids. The use of a dispersant to achieve higher dewatering solids is somewhat unexpected as conventional wisdom had taught that better dewatering rates in a decanting centrifuge and higher resultant solids are normally obtained when pigmentary products are fed to the centrifuge in a flocculated, non-dispersed form. In the present invention, it appears that the use of a dispersant helps to release water that is associated with the PCC product, especially in the case of rhombohedral shaped PCC, such that more free water exists the centrifuge overflow and a higher solids PCC product accordingly exits the underflow. While not desiring to be bound to any particular theory at this time, it nonetheless is believed that PCC aggregates comprised of rhombohedral shaped PCC crystals have increased porosity and thus increased water retention. The presence of the dispersant during decanting, per the present invention, is believed to help release water held in the interstices between rhombohedral shaped crystals. Consequently, it is thought that this expulsion of otherwise captured water on the PCC translates into increased solids content in the decanted PCC slurry, such as up to 75% solids, or even higher. This new "dispersed" de-watering step would then eliminate the need for the evaporation step in the current process design. That is, the ability to achieve such high solids content at the decanter stage of the process makes it possible to dispense with the need for a separate evaporator treatment. As the evaporator treatment conventionally needed to increase the solids content of the PCC slurry is expensive in terms of both capital costs and operating costs, the novel technique for centrifuging the slurry according to the invention represents a significant advance in the field either standing alone or as integrated into a process flow using all the unique procedures for processing PCC described herein. Use of the solid bowl centrifuge to de-water is more highly economical than the current evaporation step. Centrifugal de-watering has lower operating costs and capital costs than evaporation.

Optionally, before decanting, the dispersed, milled PCC slurry 25', can be subjected to a magnetic separation 26 procedure, although not required, to remove any magnetizable dark colored impurities from the PCC slurry. One known type of magnetic separator is a continuous flow magnetic particle separator of the type described in U.S. Pat. No. 3,983,309 to Allen et al., the contents of which are incorporated herein by reference. The magnetic separator can be steel wool packed into a canister, and the steel wool is magnetized as a PCC slurry is pumped through the canister. A preferred magnetic separator is the High Gradient Magnetic Separator (HGMS) available from Eriez Magnetics, Inc., Erie, Pa.; Pacific Electric Motors, Inc. (PEM), Oakland, Calif.; Carpco, Jacksonville, Fla.; and others). This high intensity magnetic separator, if used, is effective in separating fine, submicron sized impurities of a paramagnetic nature as well as the more strongly magnetic ferromagnetic particles. The step of magnetic separation could take place at other stages of making and processing the PCC.

In any event, the form and consistency of the PCC solids obtained after non-dispersed media milling and dispersed dewatering with a decanting centrifuge tends to resemble a thick sludge or mud or sometimes a semi-solid like "crumbles" material. After decanting, the dewatered PCC material must then be diluted slightly with an aqueous solution containing an organic dispersant, such as those already described above (e.g., sodium polyacrylate). The amount of organic dispersing agent added for this step is approximately 0.01 to 2.0 wt %, based on the dry weight of PCC present in the slurry, as needed to achieve a minimum in slurry viscosity. Thus, immediately prior to an in-line high shear, rotor/stator mixing procedure to be described, the dewatered PCC product is fluidized and redispersed by a small addition of aqueous dispersant solution, which effectively dilutes the high solids material down slightly from about 75% solids down to about 72–74% solids, where after the pumpable slurry can be subjected to an in-line high shear rotor/stator mixing operation. At this point, the resulting approximately 72–74 wt % solids content PCC slurry 27" is fed through an in-line rotor/stator type of high shear mixer 29 as indicated in FIG. 2.

Figure 3A:
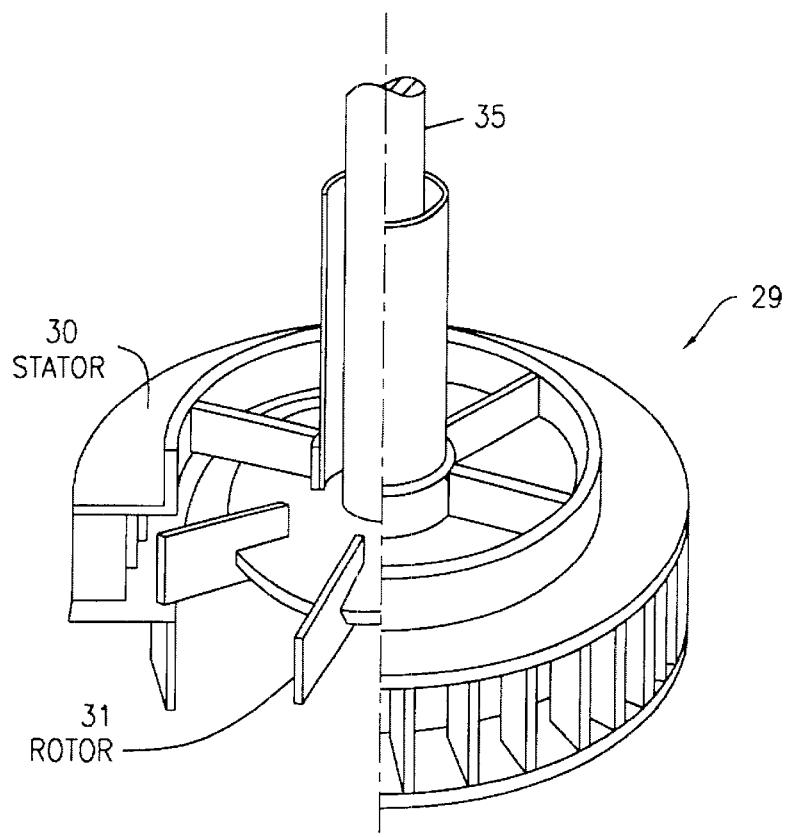
FIGS. 3A–3C are representative illustrations of different views of stator and rotor type in-line, high shear mixing devices used according to the process of the invention.
Figure 4:
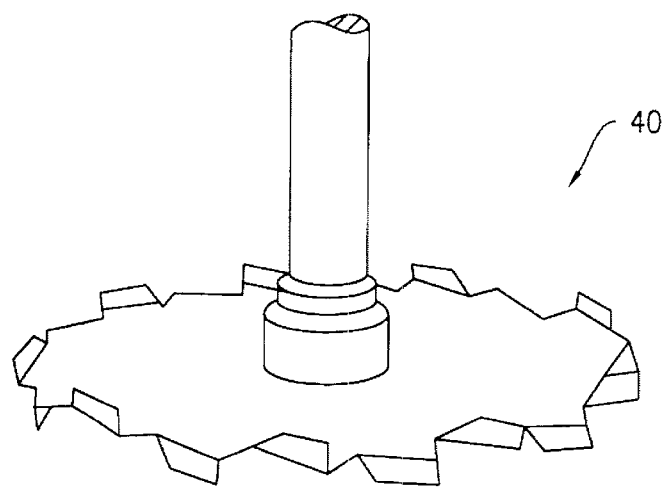
FIG. 4 is an illustration, for comparison purposes, of a Cowles type mixer.

The conventional thinking has been that axial flow mixers, such as draft tubes comprised of a cylindrical housing around an axial impeller, such as prior art Cowles type rotating impellers, such as illustrated in FIG. 4, involve flat plate impellers with sawtooth edges, were well-suited for handling slurries and suspensions of solids. However, in-line rotor/stator type high shear mixers 29 or shrouded turbines consisting of a rotor 31 and a stator 30, such as illustrated in FIGS. 3A–3C, ensure a high degree of radial flow and shearing action, and not axial flow.

Figure 3C:
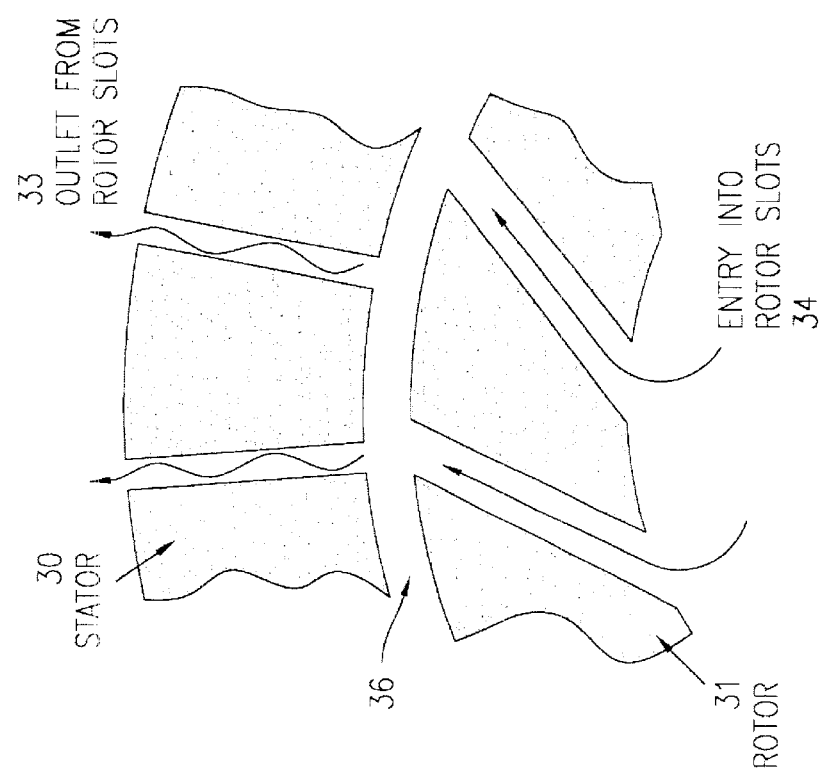
Figure 3B:
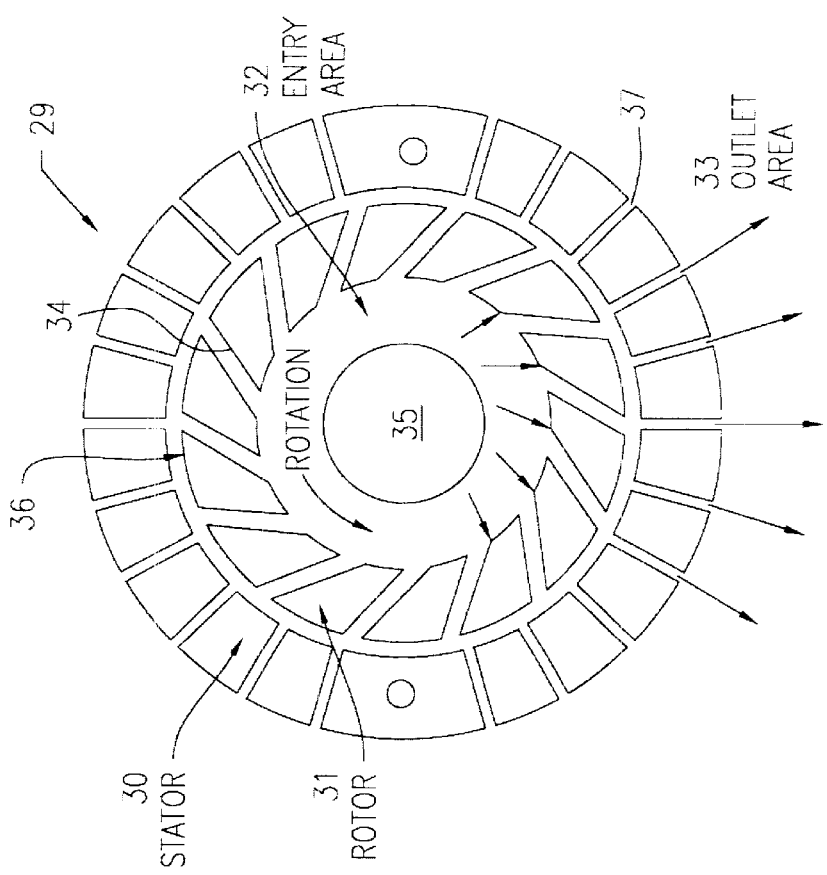

Referring to FIGS. 3A–3C, the rotor 31 is put in high speed rotation around shaft 35 while the stationary stator 30 circumferentially surrounds the rotor 31. The slurry is fed into entry area 32, and from there passes through rotor slots 34 into gap 36 between the stator 30 and rotor 31. The slurry is subjected to high radial flow shear in the gap 36 and then passes through stator slots 37 to an outlet area 33 where the sheared slurry is collected for further processing. For comparisons sake, FIG. 4 shows the design of a conventional Cowles type impeller 40 used for PCC slurry agitation, inter alia. Cowles type mixers 40 are premised more on imparted axial flow mixing to the fluid, while, by contrast, the rotor and stator mixer type high shear mixers operate by subjecting the fluid to radial flow shearing action.

That is, the high speed rotor 31 accelerates the slurry material and expels it at high speed through the stator 30. The narrow gap 36 in the radial direction is defined between the stationary stator 30 and the rotor 31 which rotates within the vertically and concentrically surrounding stator 30, and the slurry to be processed is passed under pressure through the narrow gap or clearance 36 provided between the blades of the rotor 31 and the inner concave-shaped surface of the stator 30. The slurry is subjected to high speed fluid sheer by being passed through the narrow gap 36 in the radial direction between the rotor 31 and stator 30. That is, close tolerances between the rotor 31 and stator 30 combined with high tip speeds impart high shear rates into the material as it passes across and through the faces of the rotor and stators. Gap adjustment for the gap 36 between the rotor 31 and stator 30 is typically between 0.25 to 1.5 mm for handling and processing PCC slurries according to this invention.

Remarkably, the in-line high shear mixer 29 based on rotor and stator action yields a PCC slurry 29' of about 72–74 wt % solids content that is coating grade quality. Namely, the in-line rotor and stator mixer 29 has been discovered to improve (i.e., reduce) the high shear viscosity of the PCC slurry yet without degrading the PCC particle structures. Namely, the high shear (Hercules) viscosity property of the PCC slurry 27" was reduced when subjected to the in-line rotor and stator mixer 29 action yet without undesirably increasing the slope (particle size distribution) and/or median particle sizes of the slurried PCC in any significant way. Thus, the in-line high shear mixing using a rotor/stator impeller design has been found to improve the rheology of the high solids content PCC after decanting according to this invention, or after a conventional evaporating procedure, without causing structural damage to the PCC crystalline product. Namely, the rotor/stator mixing surprisingly has been found to reduce the Hercules high-shear viscosity of a high solids content PCC slurry while preserving the incoming PCC size distribution (slope) and without reducing the median particle size. Commercially available in-line rotor/stator mixers for the practice of the invention in this regard are available, for example, from IKA-Works Inc., Wilmington, N.C. 28405 and from Charles Ross and Son Company, Hauppage, N.Y. 11788, including Models ME-410/420X, and 450X.

While not desiring to be bound to any particular theory at this time, it nonetheless is postulated that the in-line high shear rotor/stator type mixers are highly efficient in incorporating and dispersing organic dispersants on to the surfaces of the PCC particles, yet without causing structural damage to the PCC particles. By increasing the amount and uniformity of dispersant received on the surfaces of the rhombohedral PCC, it its thought that the in-line high shear rotor/stator mixer effectively brings about the observed reduction in Hercules shear viscosity without degrading PCC particle structure.

The major benefits of reducing Hercules viscosity of a coating grade PCC slurry is that the aqueous composition has improved pumpability and higher solids can be achieved, which facilitates coating immobilization upon application of the coating to a paper substrate, and also better coating runnability is achieved on high speed coating machines (e.g., scratches in the coating are reduced). For improved paper coating runnability and slurry pumpability, a low Hercules high-shear viscosity, viz., less than 18+ dynes at 700 rpm is desired, which goal is achieved by this invention. For purposes of this disclosure, and unless indicated otherwise, Hercules high shear viscosity values described and claimed herein are values measured at approximately 25° C. using a Hercules Model DV-10 high shear viscometer, manufactured by Kaltec Scientific Company, Novi, Mich. 48375, with an A-bob rotating at 1100 rpm (maximum).

In an alternative scheme of the present invention, the in-line high shear mixing step can be integrated into a conventional processing scheme for PCC as: (1)after a conventional evaporation process, or (2) in conjunction with a slurry evaporation process, or (3) it can be employed in conjunction with the evaporation process as the PCC slurry being processed is re-circulated through an evaporator, or (4) on any high solids content dispersed PCC slurry produced by other dewatering means. Where used, the evaporator type is not particularly limited as long as it is any suitable dehydrating device or system useful for dewatering high solids content, aqueous slurries. Suitable slurry dewatering systems in this regard include those that are or have been conventionally known for that use, such as conventionally known spray-drying techniques for that purpose, known dewatering systems for mineral slurries using indirect heat exchange means in evaporator-based systems, or a water extraction system such as that described in U.S. Pat. No. 3,486,740, which teachings are incorporated herein by reference. Another useful dewatering arrangement is described herein in the examples.

Stability/aging experimental tests also have been conducted on the rotor/stator processed high shear conditioned PCC slurries prepared per this invention, and it has been found that the high shear rheology benefits were bona fide and not temporary in duration. Use of the high shear rotor/stator in-line mixer also solves operational problems otherwise associated with using an evaporator, such as slurry pumpability and slurry flow through the heat exchangers, and yields a superior coating PCC product.

As can be appreciated, this invention embodies three separate process improvements which may be used separately or in combination with one another to improve the particle size distribution (slope) and Hercules high shear viscosity while enabling the elimination of an otherwise costly processing step (namely evaporation) that would be needed to achieve the requisite high solids content in the PCC slurry product to be used in paper coating compositions. As previously mentioned, the above three innovations can be incorporated separately and independent of one another into a conventional PCC process flow scheme, or in combination with each other in order to improve the product and processing characteristics of precipitated calcium carbonate. The median particle size of the PCC particles of the high solids content PCC slurries obtained by processing according to this invention generally will be in range of approximately 0.25 to 2.0 $\mu$m, and more typically between 0.5 to 1.0 $\mu$m, and within a relatively narrow size distribution defined by a slope of less than approximately 1.8, and more preferably less than approximately 1.75, and having a TAPPI brightness of greater than 96, more typically greater than 97. For purposes of this invention, the particle size of the PCC pigment is measured by a Sedigraph particle size analyzer (Model 5100, manufactured by Micromeritics Instrument Corp., Norcross, Ga.). The TAPPI brightness is measured for the dry pigment using a Technidyne Technibrite Micro TB-1C brightness meter manufactured by the Technidyne Corporation, New Albany, Ind.

The PCC slurries prepared by the above-described process scheme are especially suitable for use as coating pigments in paper coating compositions. When used in that manner, the PCC slurry is used together with a binder, such as any known paper coating binders such as latexes, proteins, starches, casein, acrylic polymers, styrene butadiene rubbers, and so forth. The binder will be used in an amount of generally between about 1 to 20 parts by weight as based on the total dry weight of all pigments present in the coating. The pigment slurry contains at least 65 wt % PCC, as indicated above, and more preferably between 70–80 wt % PCC before addition of the binder and other optional paper coating ingredients described herein. The optional paper coating ingredients include a thickener, e.g., sodium carboxymethyl cellulose or synthetic acrylic thickeners known in the paper coating field. The thickener, if used, is added in an amount of no more than about 2 parts by weight as based on the total dry weight of all pigments present. Also, other pigments besides PCC, such as kaolin clay, ground calcium carbonate, titanium dioxide, calcined clay, talc, calcium sulfate, and so forth, can be used in combination with the PCC in the paper coating composition. These other pigments can be used in amounts of about 20 to 80 wt % based on the total weight of dry pigment in the coating.

The following non-limiting examples are merely illustrative of preferred embodiments of the present invention, and are not to be construed as limiting the invention, the scope of which is defined by the appended claims. All parts, amounts, weights, percentages and ratios described in the examples are by weight, unless indicated otherwise.

EXAMPLE 1

To investigate the effects of using multiple stage, low solids wet media milling to comminute coarse PCC slurry, samples of rhombohedral PCC pigment having a median particle size of approximately 1.5 μm (Sedigraph), nominally 7 m²/g BET surface area, and a 75/25 slope value of 1.55 was subjected to a multi-stage grinding experiment.

In an initial trial, a total of 90 gallons of the PCC slurry was wet ground in multiple pass runs on a single 15 Liter Premier horizontal media mill, with an 80 vol % bead loading of 0.8 to 1.0 mm zirconia silica oxide beads, at 900 RPMs, with a 20 wt % solids non-dispersed slurry feed, and a 1.2 GPM feed rate. After four passes through the mill the grinding process yielded a Sedigraph median particle size of 0.69 μm, with a 75/25 slope value of 1.69. When operating at these low solids levels, the experimental results demonstrate that a single pass through the horizontal media mill provides insufficient grinding to produce the PCC coating product of desired median particle size and slope value. However, given the use multiple low solids passes (with all other conditions being kept the same) the process yields the PCC coating product of desired median particle size and with very low slope value. In direct comparison, a wet grinding run on this same PCC material which had been concentrated to 50 wt % solids and then dispersed with 0.8% active basis Dispex 2695 dispersant prior to being fed to the media mill yielded very different results. From a single high energy pass employing a specific energy input of about 40 kW-hr/ton a PCC product was provided that displayed a Sedigraph median particle size of about 0.65 μm with a 75/25 slope value of 1.89. The noted increase in slope value from 1.69 to 1.89 as a function of the grinding procedure employed (namely a low solids, non-dispersed, multi-pass grinding process versus a high solids, dispersed, one pass grind) represents a significant undesired broadening of the PCC's particle size distribution that translates to losses in paper coating performance.

In a next series of tests, using a 1.5 Liter Premier horizontal bead mill, the relative importance of the various mill and process parameters with respect to grinding efficiency and resultant product quality when conducting a low solids, non-dispersed grinding of PCC were further explored through the use of experimental design and analysis methods. In conducting this DOE (Design of Experiments) program the same PCC feed as described above, having a BET surface area of 7 m²/gm, was utilized. The first grinding experiment (run 1) saw the 1.5 Liter Premier mill run at a 70 vol % bead loading using 1.6 to 2.5 mm zirconium silica oxide beads. The mill was run at 1500 FPM rotor speed, with a 30 second retention time, and a 20 wt % solids non-dispersed feed slurry. By the ninth pass through the mill, the Sedigraph median particle size was down to 0.74 μm, with a slope value of 1.67. It was decided that this grind was too slow to be practical, and the experiment was abandoned.

The next experiment (run 2) saw the mill run at an 80 vol % bead loading of the 1.6 to 2.5 mm zirconium silica oxide beads. The mill was run at 2000 FPM rotor speed, with a 45 second retention time, and a 20 wt % solids non-dispersed feed slurry. By the sixth pass through the mill, the Sedigraph median particle size was down to 0.63 μm, with a slope value of 1.85.

The next experiment (run 3) was a replicate of run 2. By the seventh pass through the mill, the Sedigraph median particle size was down to 0.61 μm, with a slope value of 1.86.

The next experiment (run 4) saw the mill run at a 70 vol % bead loading using 0.6 to 0.8 mm zirconium silica oxide beads. The mill was run at 2000 FPM rotor speed, with a 30 second retention time, and a 20 wt % solids non-dispersed feed slurry. By the seventh pass through the mill, the Sedigraph median particle size was down to 0.63 μm, with a slope value of 1.70.

The next experiment (run 5) saw the mill run at a 70 vol % bead loading of the 0.6 to 0.8 mm zirconium silica oxide beads. The mill was run at 1500 FPM rotor speed, with a 45 second retention time, and a 20 wt % solids non-dispersed feed slurry. By the fifth pass through the mill, the Sedigraph median particle size was down to 0.63 μm, with a slope value of 1.70.

The next experiment (run 6) saw the mill run at an 80 vol % bead loading of the 0.6 to 0.8 mm zirconium silica oxide beads. The mill was run at 1500 FPM rotor speed, with a 30 second retention time, and a 20 wt % solids non-dispersed feed slurry. By the fifth pass through the mill, the Sedigraph median particle size was down to 0.61 μm, with a slope value of 1.64.

The next experiment (run 7) was a replicate of run 6. By the fifth pass through the mill, the Sedigraph median particle size was down to 0.62 μm, with a slope value of 1.66.

The next experiment (run 8) saw the mill run at an 80 vol % bead loading of the 0.6 to 0.8 mm zirconium silica oxide beads. The mill was run at 2000 FPM rotor speed, with a 45 second retention time, and a 30 wt % solids non-dispersed feed slurry. By the third pass through the mill, the Sedigraph median particle size was down to 0.58 μm, with a slope value of 1.72.

The next experiment (run 9) saw the mill run at a 70 vol % bead loading of the 0.6 to 0.8 mm zirconium silica oxide beads. The mill was run at 1500 FPM rotor speed, with a 30 second retention time, and a 30 wt % solids non-dispersed feed slurry. By the fourteenth pass through the mill, the Sedigraph median particle size was down to 0.57 μm, with a slope value of 1.59.

The next experiment (run 10) was a replicate of run 9. By the fourteenth pass through the mill, the Sedigraph median particle size was down to 0.63 μm, with a slope value of 1.62.

TABLE 1

| Run | % PCC Slurry Solids | % Bead Loading (% vol) | FPM | Res. Time, sec | Final MPS, μm | No. of Passes | 75/25 slope | Bead size, mm |
| --- | --- | --- | --- | --- | --- | --- | --- | --- |
| 1 | 20 | 70 | 1500 | 30 | 0.74 | 9 | 1.67 | 1.6–2.5 |
| 2 | 20 | 80 | 2000 | 45 | 0.63 | 6 | 1.62 | 1.6–2.5 |
| 3 | 20 | 80 | 2000 | 45 | 0.61 | 7 | 1.86 | 1.6–2.5 |
| 4 | 20 | 70 | 2000 | 30 | 0.63 | 7 | 1.70 | 0.6–0.8 |
| 5 | 20 | 70 | 1500 | 45 | 0.63 | 5 | 1.70 | 0.6–0.8 |
| 6 | 20 | 80 | 1500 | 30 | 0.61 | 5 | 1.64 | 0.6–0.8 |
| 7 | 20 | 80 | 1500 | 30 | 0.62 | 5 | 1.66 | 0.6–0.8 |
| 8 | 30 | 80 | 2000 | 45 | 0.58 | 3 | 1.72 | 0.6–0.8 |
| 9 | 30 | 70 | 1500 | 30 | 0.57 | 14 | 1.59 | 0.6–0.8 |
| 10 | 30 | 70 | 1500 | 30 | 0.63 | 14 | 1.62 | 0.6–0.8 |

It is pointed out that the "% Bead loading (vol %)" values reported in Table 1, as well as in Table 2 infra, were calculated as including the actual volume of the beads plus the void areas between the beads (i.e., the media void volume). Therefore, the reported bead volumes in Example 1 herein are more related to a bulk density type value than on a specific gravity value.

Also, the initial P/M particle ratio (i.e., the number of starting PCC particles relative to the number of media particles present in the mill grinding runs) for Run 3 (80"% Bead loading, 20 wt % solids, media size 0.6–0.8 mm, initial part. size of PCC feed of 1.5 μm) can be calculated to be approximately 9 million. By contrast, a PCC slurry milled per the scheme in FIG. 1 using 50 wt % PCC solids in the PCC feed slurry (media size 0.6–1.0 mm, bead loading 80–85 vol %, initial part. size of 1.5 μm) involves an initial P/M ratio value of approximately 50 million. This difference in P/M ratio values between the milling conducted per this invention versus a conventional scheme is indicative of the unique milling conditions utilized in the present invention, which have been found to help yield a relatively narrow particle size distribution in the milled product. Namely, the inventive milling conditions have been found to be effective to break-up PCC agglomerate product carried over from the PCC synthesis reaction step into the constituent primary PCC particles yet without grinding the liberated primary particles to create an amount of fines and ultrafines that would undesirably broaden the particle size distribution in the product.

The following additional PCC grinding experiments were carried out in the 1.5 Liter Premier mill to expand the scope of available DOE data so as to further evaluate the effects of feed percent solids, bead loading, rotor speed, and mill retention time.

The next grinding experiment (run 11) saw the mill run at a 75 vol % bead loading using 1.0 to 1.25 mm zirconium silica oxide beads. The mill was run at 1750 FPM rotor speed, with a 37.5 second retention time, and a 25 wt % solids non-dispersed feed slurry. By the thirteenth pass through the mill, the Sedigraph median particle size was down to 0.63 μm, with a slope value of 1.67.

The next experiment (run 12) saw the mill run at an 80 vol % bead loading of the 1.0 to 1.25 mm zirconium silica oxide beads. The mill was run at 1750 FPM rotor speed, with a 30 second retention time, and a 30 wt % solids non-dispersed feed slurry. By the eighth pass through the mill, the Sedigraph median partile size was down to 0.64 μm, with a slope value of 1.65.

The next experiment (run 13) saw the mill run at an 80 vol % bead loading of the 0.6 to 0.8 mm zirconium silica oxide beads. The mill was run at 2000 FPM rotor speed, with a 30 second retention time, and a 30 wt % solids feed slurry. By the fourth pass through the mill, the Sedigraph median particle size was down to 0.61 μm, with a slope value of 1.62.

The next experiment (run 14) saw the mill run at an 80 vol % bead loading of the 0.6 to 0.8 mm zirconium silica oxide beads. The mill was run at 1500 FPM rotor speed, with a 30 second retention time, and a 30 wt % solids non-dispersed feed slurry. By the fifth pass through the mill, the Sedigraph median particle size was down to 0.62 μm, with a slope value of 1.63.

The next experiment (run 15) saw the mill run at an 80 vol % bead loading of the 0.6 to 0.8 mm zirconium silica oxide beads. The mill was run at 1500 FPM rotor speed, with a 45 second retention time, and a 30 wt % solids non-dispersed feed slurry. By the fourth pass through the mill, the Sedigraph median particle size was down to 0.60 μm, with a slope value of 1.63.

The next experiment (run 16) saw the mill run at an 80 vol % bead loading of the 0.6 to 0.8 mm zirconium silica oxide beads. The mill was run at 2000 FPM rotor speed, with a 45 second retention time, and a 20 wt % solids non-dispersed feed slurry. By the third pass through the mill, the Sedigraph median particle size was down to 0.57 μm, with a slope value of 1.76.

The next experiment (run 17) saw the mill run at an 80 vol % bead loading of the 0.6 to 0.8 mm zirconium silica oxide beads. The mill was run at 2000 FPM rotor speed, with a 37.5 second retention time, and a 20 wt % solids non-dispersed feed slurry. By the third pass through the mill, the Sedigraph median particle size was down to 0.60 μm, with a slope value of 1.71.

The next experiment (run 18) saw the mill run at an 80 vol % bead loading of the 0.6 to 0.8 mm zirconium silica oxide beads. The mill was run at 1500 FPM rotor speed, with a 45 second retention time, and a 20 wt % solids non-dispersed feed slurry. By the fourth pass through the mill, the Sedigraph median particle size was down to 0.59 μm, with a slope value of 1.70.

The next experiment (run 19) saw the mill run at an 85 vol % bead loading of the 0.6 to 0.8 mm zirconium silica oxide beads. The mill was run at 2000 FPM rotor speed, with a 30 second retention time, and a 30 wt % solids non-dispersed feed slurry. By the third pass through the mill, the Sedigraph median particle size was down to 0.56 μm, with a slope value of 1.69. After 24 hours, these values had changed to a Sedigraph median particle size of 0.58 μm, with a slope of 1.66.

The next experiment (run 20) saw the mill run at an 85 vol % bead loading of the 0.6 to 0.8 mm zirconium silica oxide beads. The mill was run at 2000 FPM rotor speed, with a 30 second retention time, and a 20 wt % solids non-dispersed feed slurry. By the third pass through the mill, the Sedigraph median particle size was down to 0.55 μm, with a slope value of 1.80. This experiment was then repeated (as run 21), and by the third pass, the Sedigraph median particle size was down to 0.56 μm, with a slope value of 1.80.

The next experiment (run 22) saw the mill run at an 85 vol % bead loading of the 0.6 to 0.8 mm zirconium silica oxide beads. The mill was run at 2000 FPM rotor speed, with a 30 second retention time, and a 20 wt % solids non-dispersed feed slurry. By the third pass through the mill, the Sedigraph median particle size was down to 0.56 μm, with a slope value of 1.80.

The next experiment (run 23) saw the mill run at an 80 vol % bead loading of the 0.6 to 0.8 mm zirconium silica oxide beads. The mill was run at 1500 FPM rotor speed, with a 45 second retention time, and a 24 wt % solids non-dispersed feed slurry. By the third pass through the mill, the Sedigraph median particle size was down to 0.62 μm, with a slope value of 1.66.

The next experiment (run 24) saw the mill run at an 80 vol % bead loading of the 0.6 to 0.8 mm zirconium silica oxide beads. The mill was run at 1500 FPM rotor speed, with a 45 second retention time, and a 20 wt % solids non-dispersed feed slurry. By the fourth pass through the mill, the Sedigraph median particle size was down to 0.60 μm, with a slope value of 1.75.

The next experiment (run 25) saw the mill run at an 80 vol % bead loading of the 0.6 to 0.8 mm zirconium silica oxide beads. The mill was run at 2000 FPM rotor speed, with a 30 second retention time, and a 20 wt % solids non-dispersed feed slurry. By the fourth pass through the mill, the Sedigraph median particle size was down to 0.59 μm, with a slope value of 1.77.

The next experiment (run 26) saw the mill run at an 80 vol % bead loading of the 0.6 to 0.8 mm zirconium silica oxide beads. The mill was run at 2000 FPM rotor speed, with a 37.5 second retention time, and a 20 wt % solids non-dispersed feed slurry. By the fourth pass through the mill, the Sedigraph median particle size was down to 0.57 μm, with a slope value of 1.78.

The next experiment (run 27) saw the mill run at an 80 vol % bead loading of the 0.6 to 0.8 mm zirconium silica oxide beads. The mill was run at 1750 FPM rotor speed, with a 30 second retention time, and a 20 wt % solids non-dispersed feed slurry. By the fourth pass through the mill, the Sedigraph median particle size was down to 0.62 μm, with a slope value of 1.72.

The next experiment (run 28) saw the mill run at an 80 vol % bead loading of the 0.6 to 0.8 mm zirconium silica oxide beads. The mill was run at 2000 FPM rotor speed, with a 30 second retention time, and a 20 wt % solids non-dispersed feed slurry. By the fourth pass through the mill, the Sedigraph median particle size was down to 0.58 μm, with a slope value of 1.72.

The next experiment (run 29) saw the mill run at an 80 vol % bead loading of the 0.6 to 0.8 mm Zirconium Silica Oxide beads. The mill was run at 1750 FPM rotor speed, with a 37.5 second retention time, and a 20 wt % solids non-dispersed feed slurry. By the fourth pass through the mill, the Sedigraph median particle size was down to 0.59 μm, with a slope value of 1.74.

The next experiment (run 30) saw the mill run at an 80 vol % bead loading of the 0.6 to 0.8 mm zirconium silica oxide beads. The mill was run at 1750 FPM rotor speed, with a 30 second retention time, and a 20 wt % solids non-dispersed feed slurry. By the fourth pass through the mill, the Sedigraph median particle size was down to 0.62 μm, with a slope value of 1.70.

The next experiment (run 31) saw the mill run at an 80 vol % bead loading of the 0.6 to 0.8 mm zirconium silica oxide beads. The mill was run at 2000 FPM rotor speed, with a 37.5 second retention time, and a 20 wt % solids non-dispersed feed slurry. By the third pass through the mill, the Sedigraph median particle size was down to 0.59 μm, with a slope value of 1.73.

The next experiment (run 32) saw the mill run at an 80 vol % bead loading of the 0.6 to 0.8 mm zirconium silica oxide beads. The mill was run at 1500 FPM rotor speed, with a 45 second retention time, and a 20 wt % solids non-dispersed feed slurry. By the fourth pass through the mill, the Sedigraph median particle size was down to 0.61 μm, with a slope value of 1.69.

The next experiment (run 33) saw the mill run at an 80 vol % bead loading of the 0.6 to 0.8 mm zirconium silica oxide beads. The mill was run at 1500 FPM rotor speed, with a 30 second retention time, and a 20 wt % solids non-dispersed feed slurry. By the fifth pass through the mill, the Sedigraph median particle size was down to 0.61 μm, with a slope value of 1.65.

The next experiment (run 34) saw the mill run at an 80 vol % bead loading of the 0.6 to 0.8 mm zirconium silica oxide beads. The mill was run at 2000 FPM rotor speed, with a 30 second retention time, and a 25 wt % solids non-dispersed feed slurry. By the fourth pass through the mill, the Sedigraph median particle size was down to 0.61 μm, with a slope value of 1.71.

The next experiment (run 35) saw the mill run at an 80 vol % bead loading of the 0.6 to 0.8 mm zirconium silica oxide beads. The mill was run at 1750 FPM rotor speed, with a 37.5 second retention time, and a 25 wt % solids non-dispersed feed slurry. By the fourth pass through the mill, the Sedigraph median particle size was down to 0.61 μm, with a slope value of 1.67.

TABLE 2

| Run | % PCC Slurry Solids | % Bead Loading (% vol) | FPM | Res. Time, sec | Final MPS, μm | No. of Passes | 75/25 slope | Beads, mm |
|---|---|---|---|---|---|---|---|---|
| 11 | 25 | 75 | 1750 | 37.5 | 0.63 | 13 | 1.67 | 1.0–1.25 |
| 12 | 30 | 80 | 1750 | 30 | 0.64 | 8 | 1.65 | 1.0–1.25 |
| 13 | 30 | 80 | 2000 | 30 | 0.61 | 4 | 1.62 | 0.6–0.8 |
| 14 | 30 | 80 | 1500 | 30 | 0.62 | 5 | 1.63 | 0.6–0.8 |
| 15 | 30 | 80 | 1500 | 45 | 0.60 | 4 | 1.63 | 0.6–0.8 |
| 16 | 20 | 80 | 2000 | 45 | 0.57 | 3 | 1.76 | 0.6–0.8 |
| 17 | 20 | 80 | 2000 | 37.5 | 0.60 | 3 | 1.71 | 0.6–0.8 |
| 18 | 20 | 80 | 1500 | 45 | 0.59 | 4 | 1.70 | 0.6–0.8 |
| 19 | 30 | 85 | 2000 | 30 | 0.56 | 3 | 1.69 | 0.6–0.8 |
| 20 | 20 | 85 | 2000 | 30 | 0.55 | 3 | 1.80 | 0.6–0.8 |
| 21 | 20 | 85 | 2000 | 30 | 0.56 | 3 | 1.80 | 0.6–0.8 |
| 22 | 20 | 85 | 2000 | 30 | 0.56 | 3 | 1.80 | 0.6–0.8 |
| 23 | 24 | 80 | 1500 | 45 | 0.62 | 3 | 1.66 | 0.6–0.8 |
| 24 | 20 | 80 | 1500 | 45 | 0.60 | 4 | 1.75 | 0.6–0.8 |
| 25 | 20 | 80 | 2000 | 30 | 0.59 | 4 | 1.77 | 0.6–0.8 |
| 26 | 20 | 80 | 2000 | 37.5 | 0.57 | 4 | 1.78 | 0.6–0.8 |
| 27 | 20 | 80 | 1750 | 30 | 0.62 | 4 | 1.72 | 0.6–0.8 |
| 28 | 20 | 80 | 2000 | 30 | 0.58 | 4 | 1.72 | 0.6–0.8 |
| 29 | 20 | 80 | 1750 | 37.5 | 0.59 | 4 | 1.74 | 0.6–0.8 |
| 30 | 20 | 80 | 1750 | 30 | 0.62 | 4 | 1.70 | 0.6–0.8 |
| 31 | 20 | 80 | 2000 | 37.5 | 0.59 | 3 | 1.73 | 0.6–0.8 |
| 32 | 20 | 80 | 1500 | 45 | 0.61 | 4 | 1.69 | 0.6–0.8 |
| 33 | 20 | 80 | 1500 | 30 | 0.61 | 5 | 1.65 | 0.6–0.8 |
| 34 | 25 | 80 | 2000 | 30 | 0.61 | 4 | 1.71 | 0.6–0.8 |
| 35 | 25 | 80 | 1750 | 37.5 | 0.61 | 4 | 1.67 | 0.6–0.8 |

The experimental results from our DOE grinding study have shown that by using a non-dispersed PCC slurry and employing low solids (20–30 wt %) media mill grinding conditions, with multiple passes, that a Sedigraph median particle size of approximately 0.61 μm, with a 75/25 slope value of approximately 1.61 to 1.64, can be readily obtained from a rhombohedral PCC reaction product having an original BET surface area of 7 m$^2$/gm. These target values take roughly 3–5 passes through the media mill using about a 35 second retention time at a mill rotor speed of 1500 FPM, with an 80 vol % bead loading of the 0.6–0.8 mm zirconia silica oxide media. To illustrate the advantages of the inventive grinding process, the noted particle values should be compared to the intensive, single pass grinding results achieved (a MPS=0.65 μm and slope=1.89) on the analogous PCC reactor product which was fed to the mill in dispersed form at high solids (i.e., 50 wt %).

Figure 5A:
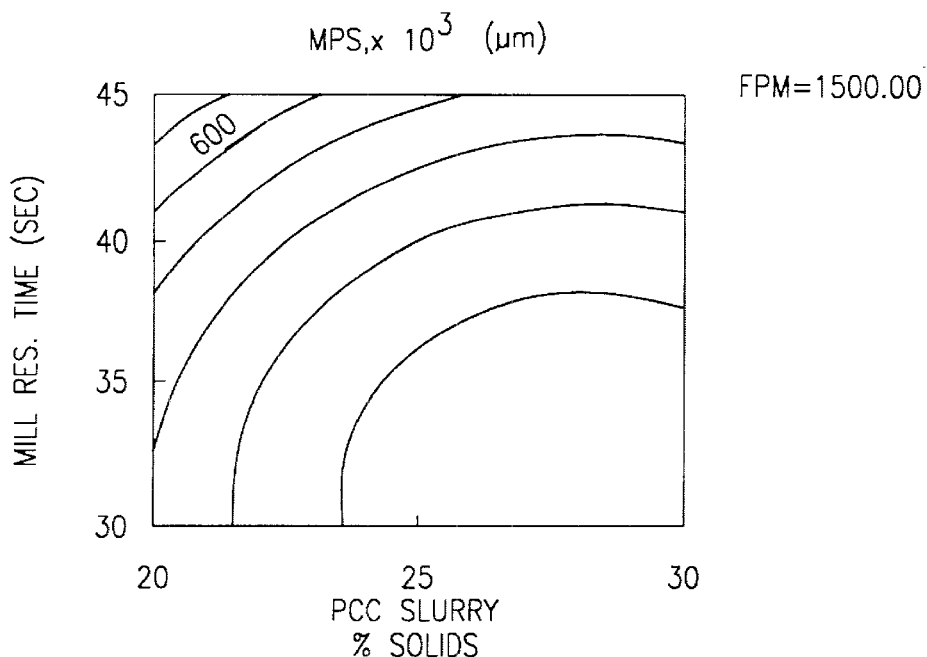
FIGS. 5A–5B show the Sedigraph median particle size (MPS) values of a PCC coating pigment, in microns, plotted as contour curves against wt % solids of the PCC slurry being milled versus mill residence time (per pass), in seconds, for wet grinding experiments that were conducted at mill rotor speeds of 1,500 FPM (FIG. 5A) and 2,000 FPM (FIG. 5B), respectively.
Figure 5B:
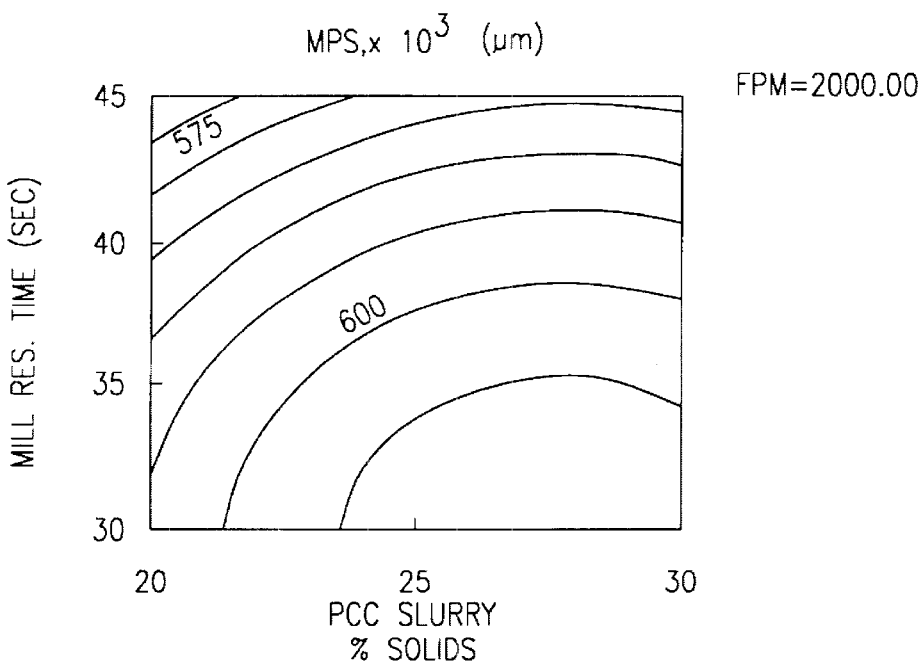
Figure 6A:
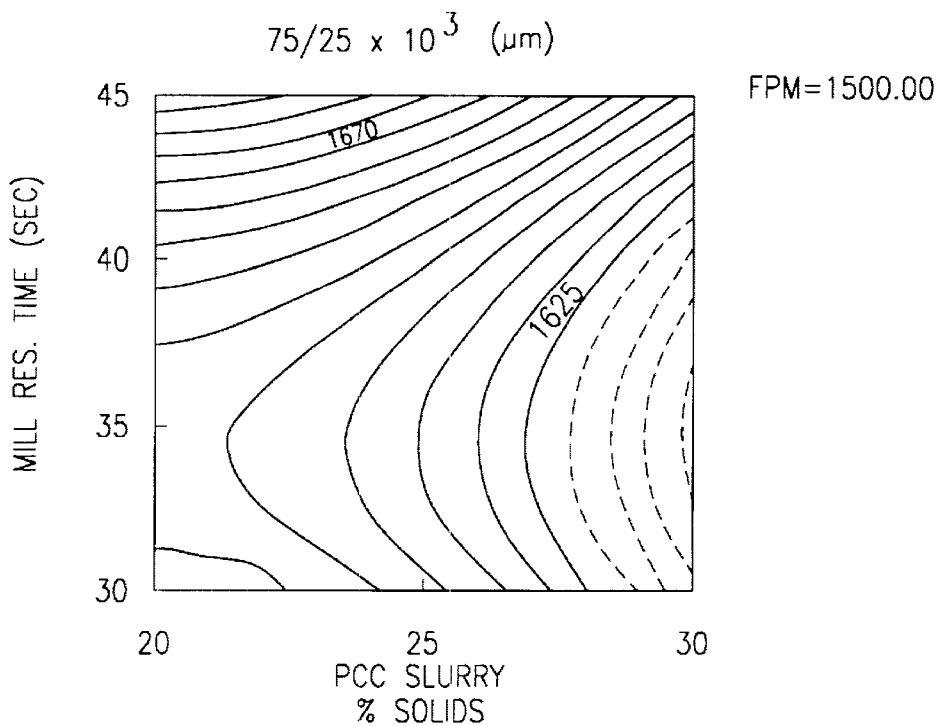
FIGS. 6A–6B show the 75/25 slope values of a PCC coating pigment plotted as contour curves against wt % solids of the PCC feed slurry fed to the mill versus mill residence time (per pass), in seconds, for wet grinding experiments that were conducted at mill rotor speeds of 1,500 FPM (FIG. 6A) and 2,000 FPM (FIG. 6B), respectively.
Figure 6B:
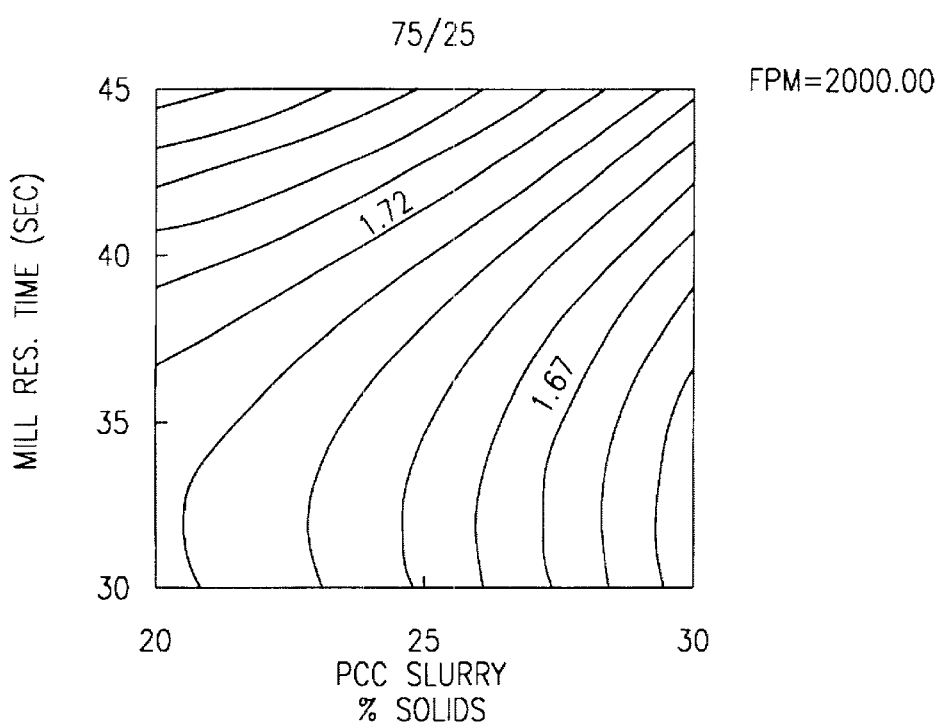
Figure 7A:
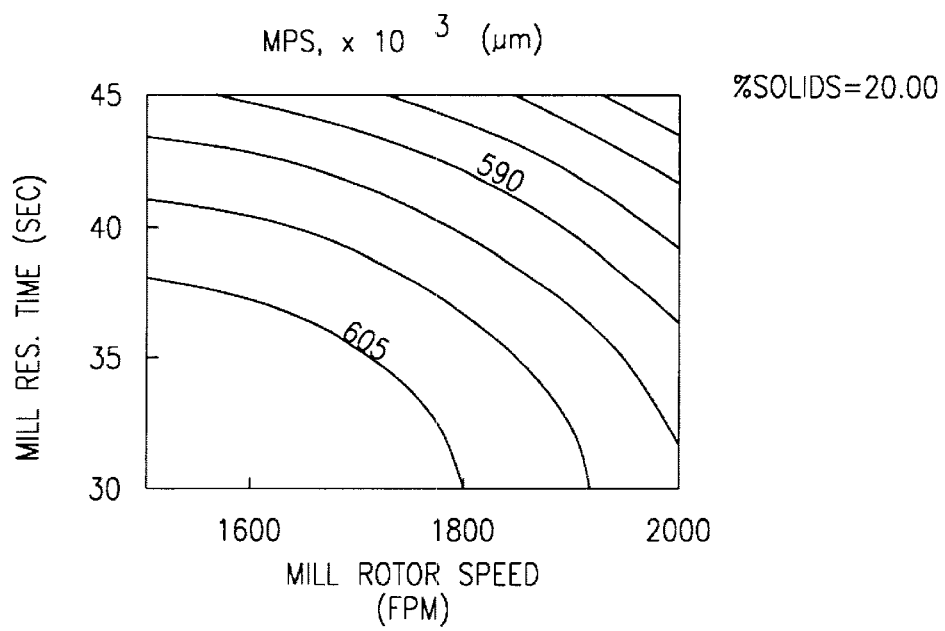
FIGS. 7A–7C show a set of contour curves whereby the resulting Sedigraph median particle size (in microns) (FIG. 7A), 75/25 slope value (FIG. 7B), and the number of passes through the mill (FIG. 7C) are each respectively contour plotted against mill rotor speed (in FPM) versus mill residence time (per pass), in seconds, for PCC wet grinding experiments that were all conducted with PCC slurries at 20 wt % solids.
Figure 7B:
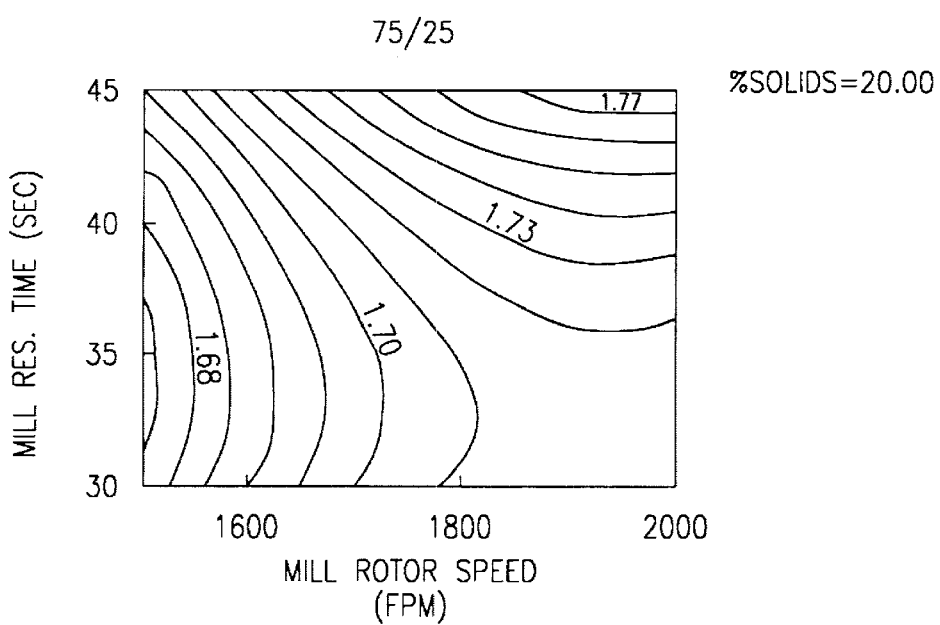
Figure 7C:
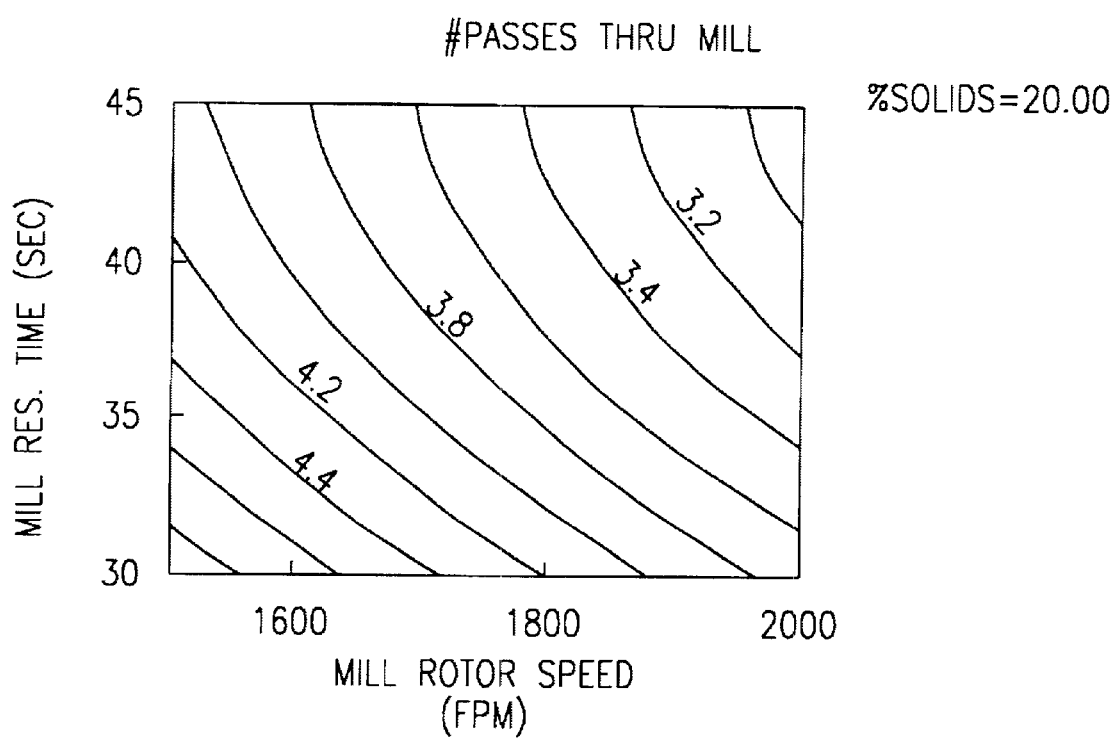

The results obtained from the DOE milling experiments, illustrated graphically in FIGS. 5A and 5B, show that the minimum Sedigraph median particle size is best achieved using a low (about 20 wt %) solids content in the PCC slurry feed, higher rotor speeds, and with longer residence times. However, to achieve the best 75/25 slope value, the higher solids content range (30 wt %) shows marginally better results than at 20 wt % (see FIGS. 6A and 6B), while at a given PCC solids content a better 75/25 slope value was obtained at a particular median particle size when using lower residence times and lower mill rotor speeds (see FIG.'S 7A, &*b* and 7C for test values obtained at 20% solids). The number of passes required to achieve the desired median particle size of about 0.6 μm was not significantly affected by slurry feed solids at low residence times, but as the residence time grows, the feed solids were found have an increasing effect. In general, and as seen in FIG. 7C, the higher rotor speed, the lower the number of passes required to achieve the desired median particle size. At a fixed bead loading, media type and mill rotor speed, increasing the residence time will reduce the number of passes through the mill required to achieve the desired Sedigraph median particle size. The above processing trends are readily seen in the contour plots presented in FIGS. 5–7 which were all determined from the experimental test data of Tables 1 and 2 by using "Experimentation by Design™" software, commercially available from ECHIP, Inc., 724 Yorklyn Road, Hockessin, Del., 19707 U.S.A.

EXAMPLE II

The effect of an organic dispersant as used in conjunction with a solid bowl centrifuge in dewatering a low solids content, premilled PCC slurry was studied. The PCC slurry material that was tested for these experiments was at 20 wt % solids, and the PCC particles had a BET Surface area of 7.0 $m^2$/g, a Sedigraph median particle size of approximately 1.5 μm and a particle size distribution slope of 1.55. A portion of this 20 wt % solids material was fed to a 15 Liter Premier mill, using 80 vol % bead loading (0.8–1.0 mm zirconium silica oxide media), 900 RPMs, and a feed rate of 1.2 GPM. After three passes, the Sedigraph median particle size was down to 0.73 μm (slope of 1.69) and the feed rate was turned up to 1.5 GPM. After the fourth pass, ten gallons of 0.69 μm Sedigraph median particle size material, with a slope of 1.69 was withdrawn. The rest of the material was then passed three more times through the Premier mill, to yield a Sedigraph median particle size of 0.61 μm, with a particle size distribution slope of 1.71.

The above-described seven-pass milled PCC slurry material was then fed at 20 wt. % solids to a Bird solid bowl centrifuge (Model 4900, 6"×12" continuous solid bowl centrifuge commercially obtained from Bird Machine Co., South Walpole, Mass.), with 1.0% (active basis) Colloid 211 dispersant having been pre-mixed therewith after the wet media milling procedure and before being fed into the solid bowl centrifuge. The centrifuge was run at 2750 G's, with a 0.25 GPM feed. A small trickle of water containing additional dispersant was fed to the Centrifuge vent, to ease the discharge of the underflow. Under these conditions, it took nine minutes before any underflow was discharged from the centrifuge. The overflow was less than 1% solids, and the underflow was at 78.89 wt % solids, with a Sedigraph median particle size of 0.60 μm and a slope of 1.76. Increasing the feed rate to 0.5 GPM, yielded an overflow of 7.60 wt %, with the underflow at 80.71 wt % solids. The underflow Sedigraph median particle size was 0.61 μm and the slope was 1.73. Raising the feed rate to 0.75 GPM, yielded an overflow of 12.25 wt % solids. The underflow was 80.24 wt % solids, with a Sedigraph median particle size of 0.61 μm, with a slope of 1.71.

In a separate test, by reducing the feed solids to 10 wt %, and running the centrifuge at 2750 G's, with a feed rate of 0.5 GPM (and continuing the 1.0% (active basis) Colloid 211 dispersant dosage), it was shown that the overflow was less than 1 wt %. The underflow was at 78.19 wt % solids, with a Sedigraph Median particle size of 0.60 μm, and a slope of 1.73. Decreasing the feed rate to 0.25 GPM yielded an underflow of 78.81 wt % solids, with a Sedigraph median particle size of 0.58 μm, with a slope of 1.80.

These results demonstrated that very high solids content, dewatered PCC slurries, as high as about 75–80 wt % solids, could be obtained by filtering the premilled low solids content PCC slurry as predispersed in an organic dispersant in a solid bowl centrifuge, and without sacrificing the improved slope achieved in a preceding multi-stage grinding operation conducted according to another aspect of the invention.

EXAMPLE III

A series of experiments were conducted to study the effect of an in-line high shear rotor/stator mixer on the high shear viscosity property of a high solids content, otherwise final rhombohedral-based PCC slurry product. Experiments were conducted using an in-line rotor/stator mixer, Ross mixer Model No. ME-410X, obtained from Charles Ross and Company, Hauppage, N.Y., used in combination with a single stage, single effect, forced recirculation evaporator with the use of a PCC slurry product recirculation loop as slurry solid levels were being continuously raised. That is, in the evaporator operation, a certain percentage of the product PCC slurry stream having higher solids content which exited the evaporator was recycled back to an input feed stream to the evaporator until a steady state run condition was achieved insofar as the solids level in the PCC slurry being treated. At that juncture, it was found that a rotor/stator mixer could be easily installed into the recirculation loop to affect improvements in high-shear slurry viscosity in the high solids slurry.

Figure 8:
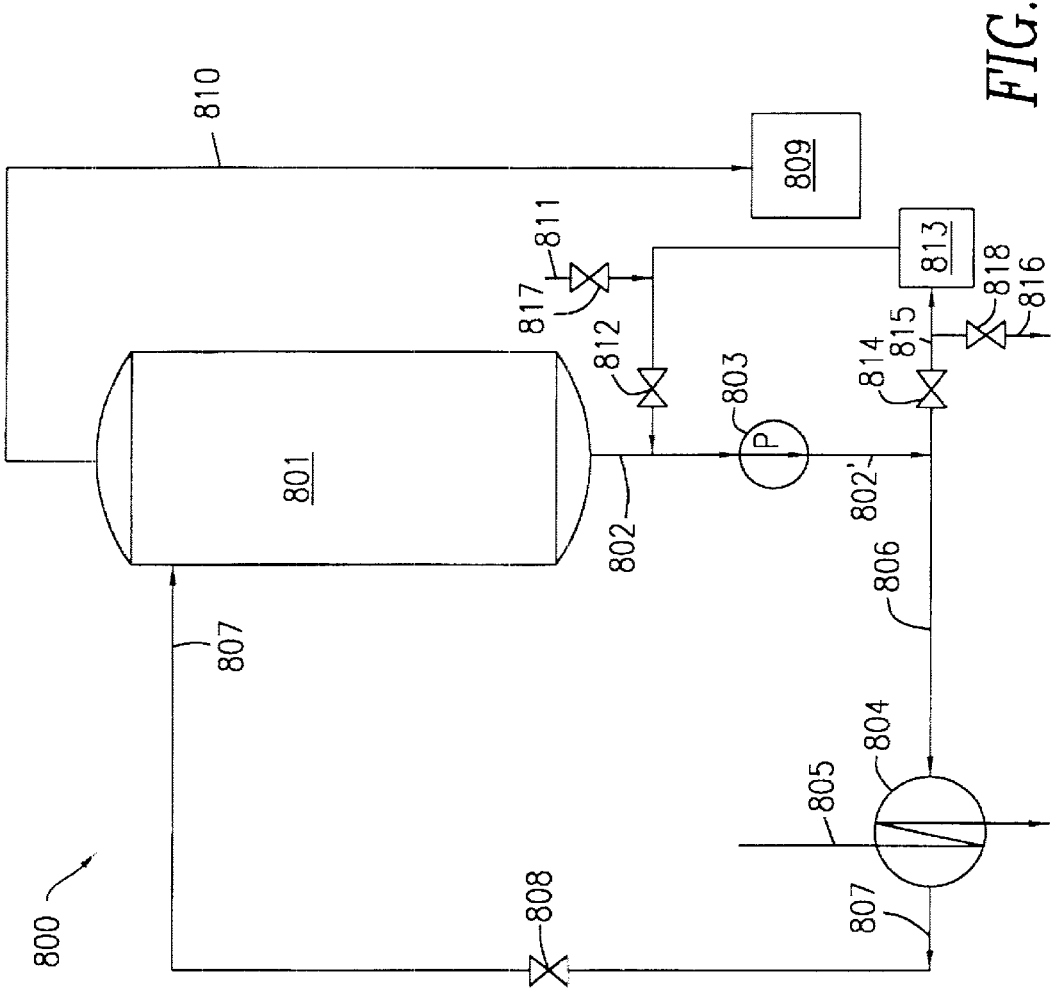
FIG. 8 schematically shows a flow diagram of an arrangement of a rotor and stator type in-line, high shear mixing device with an evaporator according to an embodiment of the invention.

More specifically, the arrangement of the rotor/stator mixer and the evaporator used in this regard was as follows. As schematically illustrated in FIG. 8, an integrated evaporator and rotor/stator mixer system 800 was provided that included a flash tank 801 that was supported about four feet off the floor (not shown). The flash tank 801 was sized to accommodate a liquid level reaching approximately eight feet above the floor. From the bottom of the flash tank 801, a three inch PVC pipe carried a PCC slurry stream 802 from the bottom region of flash tank 801 to a three inch air powered diaphragm pump 803 installed on the floor. The pump 803 also could instead be a centrifugal type pump, for example, where larger throughputs are involved. The discharge 806 of the diaphragm pump 803 proceeded to a plate and frame type heat exchanger 804 located immediately adjacent to supports (not shown) for the flash tank 801. The heat exchanger 804 was heated by low pressure steam 805 (up to 200 psig), under manual control. The heated PCC slurry 807 exited the heat exchanger 804 and rose past a back pressure valve 808 (used to suppress boiling in the heat exchanger 804) to a tangential entry on the flash tank 801. PCC slurry feed 811 (i.e., milled synthesized PCC slurry) was introduced to the system 800 through a connection made between the flash tank 801 and the pump suction side on diaphragm pump 803, although the introduction of a given batch volume of PCC slurry to be processed in system 800 could be introduced at any convenient location in the system for this purpose. A valve 817 was used to control the feeding of the batch of PCC slurry feed 811 into the system 800. A liquid ring vacuum pump 809 extracts water vapor 810 from the top of the flash tank 801 (and also acts to condense the water vapor in the pump, extracting the evaporated water from the system).

In operating the system 800, the evaporator flash tank 801 was filled to a given level, and without initially diverting any PCC slurry portion to a rotor/stator mixer 813, the system 800 was operated, batch-wise, with slurry stream 802 recirculated through heat exchanger 804 back to flash tank 801 until the target slurry solids content of 65 wt % or higher was achieved in the slurry in product stream 802. The evaporator was run at 65–75° C., with approximately 25 inches of vacuum in the flash tank 801. The PCC slurry 802 leaving flash tank 801 acquired a higher solids content over time as water vapor fractions 810 were cumulatively separated (evaporated) from the heated PCC slurry feed 807 as the product stream 802 was continuously recirculated through heat exchanger 804 and fed back into flash tank 801 as the heated feed slurry 807.

When the solids content in the PCC product stream 802 reached the desired level, such as 65 wt % or higher, it was at this point that a portion of the PCC slurry being recirculated in the system 800 was diverted through the rotor/stator mixer 813 for treatment, as the system 800 continued to be operated. To accomplish this, part (generally about 20–70 vol %, more typically about 40–50 vol %) of the concentrated slurry product 802 was taken and diverted off the conduit line 802' between the pump discharge of pump 803 and the inlet of the heat exchanger 804. A valve 814 was used to control the proportion of the PCC slurry in conduit 802' that was diverted as a stream 815 fed to the rotor/stator mixer 813, while the remainder 806 of stream 802 was conducted on to heat exchanger 804 and recycled back into flash tank 801. Thus, as the concentrated slurry 802 was recirculated through the evaporator system 800, a split-stream 815 was taken off from the recirculation pump discharge of pump 803, and passed through a separate loop passing through the rotor/stator mixer 813, before being injected back into the pump suction side of pump 803 along with stream 802. After processing PCC slurry in system 800 batch-wise in this manner, the PCC slurry product was withdrawn from the system 800 using a drain/discharge outlet line 816 that could be manually opened and closed via valve 818.

The system 800 can be effectively used to dewater a PCC slurry having an initial solids content generally in the range of about 50 wt % or higher, to provide a product a dewatered slurry having a solids content exceeding about 65 wt % solids and preferably about 72 wt % or higher. Lower starting solids content could be used, but the system 800 would have to be used more intensively on that feed slurry to remove more water and ultimately provide the high solids desired. Thus, decanting is described herein as one way to provide about 50 wt % or higher feed slurry available for further treatment in system 800. Also, from a practical standpoint and depending on the choice of equipment employed, it can become problematic to run the system 800 long enough to create a solids content in the PCC product slurry of greater than about 76 wt % because it can become difficult to force the very high solids content slurries through the plate and frame type heat exchanger. Other types of heat exchangers, such as shell and tube type heat exchangers should accommodate an even higher solids content, but the tradeoff is that they generally are not as thermally efficient units.

Although these experiments used the evaporator system 800 in a batch mode, it is to be understood that the system also could be operated continuously. In such a continuous run mode, the system 800 would be filled with about 50–65 wt % solids PCC slurry, for example, and then the valve 817 would be temporarily closed, and then the system would be operated in a batch like mode until the solids content in the slurry reached a relatively high solids content (e.g., about 65 wt % or higher) at which point inlet feed valve 811 and discharge product valve 816 can be opened to run the system in the continuous mode. The rotor/stator mixer 813 preferably would not be used until the relatively higher solids content (i.e., about 65 wt % or higher) was reached in the system.

As the feed PCC slurry 811 used in the actual experiments reported herein, two separate batches of decanted and milled 50 wt % solids, rhombohedral-based PCC product were prepared and obtained according to a process flow as generally shown in FIG. 1. One batch had been ground at an energy level of 60 kW-hr/ton using a Drais mill, and the other batch had been ground at 40 kW-hr/ton using the Drais Mill. In both experiments, a single pass grinding run at 50 wt % solids was utilized wherein the rhombohedral PCC feed material to the Drais mill had been dispersed with DISPEX 2695 at an active level dosage of 0.8% by weight.

As summarized in Table 3A, run 37 was a sample of the high solids ground PCC slurry material (of about 50 wt % solids) that is produced using an energy input of about 60 kW-hr/ton. An experimental run 38 was a control experiment involving evaporation of the 60 kW-hr/ton slurry material but without the use of the rotor/stator in-line mixer 813. The Hercules A-bob viscosity at 1100 rpm was 18+ dynes at 90 rpm. In test runs 39–45, the rotor/stator mixer was used together with the evaporator. In run 39, a small portion of the test material obtained from run 38 was then cut to 74% solids to assess the impact of incremental solids dilution on resultant Hercules high-shear viscosity. The Hercules of the 74 wt % solids slurry improved from 18+ dynes at 90 rpm to only 18+ dynes at 200 rpm. In run 40, an evaporated solids level of 74.5 wt % was reached before the pump to the evaporator slowed to a near stop. From this standard evaporation run, it was noted that the PCC's median particle size (by Sedigraph) was reduced from 0.57 μm (run 37) down to 0.50 μm (run 40) after the product had been evaporated to 74.5 wt % solids. The 75/25 slope value had accordingly changed from 1.93 to 1.89.

The original evaporated material at 74.5 wt % solids was then used to determine run conditions for the rotor/stator mixer. The amount of shear on the rotor/stator mixer was variable as to the three parameters of rotor speed, number of shims (clearance between rotor and stator) and slurry flow rate through the unit. The greater the number of shims used, the more the reduction in clearance between the rotor and stator which increases the amount of applied shear on the product. The first condition chosen was of 30 Hz, 3 shims, and 0.25 gpm. The use of 3 shims corresponds to a clearance of 0.030". This condition reduced the Hercules viscosity from 18+ dynes at 90 rpm to 2.8 dynes at 1100 rpm. In Table 3A, the run conditions and resulting viscosities for all of the various runs using the 60 kW-hr/ton feed material are summarized. Other conditions were tested until a condition of 60 Hz, no shims and 0.55 gpm was chosen. Using no shims corresponds to a clearance of 0.060". From these experimental tests, it was determined that the flow rate was limited by the number of shims used. The run conditions tested show that at the top speed (60 Hz), without any shims and at a fairly high flow rate, an acceptable Hercules high-shear viscosity can be obtained. It can be seen from Table 3A, that the median particle size (by Sedigraph) was negligibly reduced from 0.53 μm down to about 0.50 μm, from any of the rotor/stator conditions employed in the studies reported herein. The 75/25 slope value slightly improved though, from about 1.95 down to 1.86–1.91. Then the rotor/stator in-line mixer was connected to the evaporation system for testing, but due to piping constraints, all of the re-circulated slurry could not pass through the rotor/stator mixer. A back pressure valve was adjusted to divert a certain portion of the re-circulated slurry through the rotor/stator mixer (viz. about 20–70 vol %, more typically about 40–50 vol %), while the rest was fed to the evaporator chamber. This allowed for a vacuum to be maintained, while also not allowing the slurry to dry in the heat exchanger. The 60 kW-hr/ton slurry was then circulated through the evaporator until a solids level of about 65% was reached. Then a portion of the re-circulated slurry was diverted to the rotor/stator mixer at 60 Hz, with no shims, at a feed rate of 0.55 gpm. The Hercules viscosity of this material at 75.31% solids was reduced to 18 dynes at 935 rpm. For comparison to a previous sample, this material was also then diluted to 74% solids. Without using the rotor/stator mixer, the Hercules viscosity at 74% solids (run 39) was 18+ dynes at 200 rpm. By using the rotor/stator mixer, the Hercules viscosity was reduced to 5.9 dynes at 1100 rpm. The particle size of this test material (run 45) was 0.52 μm with a 1.92 slope value as compared to 0.53 μm with a 1.95 slope for the evaporated, no rotor/stator mixer control slurry. It therefore appears that under appropriate operating conditions, the rotor/stator mixer can provide significant improvements in Hercules high-shear viscosity while having essentially no deleterious effect on either reducing the median particle size or on increasing the 75/25 slope properties of the processed PCC slurry relative to the standard evaporated product.

It is pointed out that measurement of Hercules high shear viscosity values reported herein involved a possible range of 1 to 18 dynes for the Hercules viscometer device used. For Hercules high-shear viscosity measurement values reported herein of 18 dynes or lower, the value is the absolute value as recorded at 1100 rpm (the maximum rpm possible with the Hercules viscometer device employed given the use of the A-bob). On the other hand, Hercules high-shear viscosity measurement values reported herein of "18+" dynes means that the measurement was off-scale insofar as the dyne value and therefore the concurrently reported "rpm" value is significant as it indicates at what rpm setting the measurement would seize up on the slurry sample being tested for Hercules shear viscosity. Thus, for reported "18+" dyne measurement values herein, there is an inverse relationship between rpm value and the relative high shear viscosity value. For example, at 18+ dynes, the higher the reported rpm value therewith, the relatively lower the high shear viscosity of that particular PCC slurry sample as compared to another PCC slurry sample also having a 18+ dyne Hercules reading but a lower rpm value.

TABLE 3A 60 kW-hr/ton Evaporation Experiments

| Sample: (Description)/ Run# | wt % Solids | Sedigraph M.P.S., μm | 75/25 Slope | Brookfield Visc. @ 20 rpm, cps | Brookfield Visc. @ 100 rpm, cps | Hercules Visc. A bob @ 1100 rpm, dynes |
|---|---|---|---|---|---|---|
| PCC Feed slurry Run 37 | 49.88 | 0.57 | 1.93 | — | — | — |
| (Evaporated Control-74% solids, No rotor/stator Mixer) Run 38 | 74.5 | 0.53 | 1.95 | 1280 | 574 | 18+ @ 90 rpm |
| (Evaporated Control - Run 38 with Solids cut to 74%) Run 39 | 73.93 | 0.53 | 1.95 | 1196 | 520 | 18+ @ 200 rpm |
| (Evaporated Control at 74.5% solids then passed through rotor/stator Mixer) (rotor/stator Mixer Conditions: 30 Hz, 3 shims, 0.25 gpm) Run 40 | 74.5 | 0.50 | 1.89 | 780 | 460 | 2.8 @ 1100 rpm |
| (Evaporated Control at 74.5% solids then passed through rotor/stator Mixer) (rotor/stator Mixer Conditions: 45 Hz, 3 shims, 0.25 gpm) Run 41 | 74.5 | 0.50 | 1.86 | 1074 | 500 | 2.8 @ 1100 rpm |
| (Evaporated Control at 74.5% solids then passed through rotor/stator Mixer) (rotor/stator Mixer Conditions: 60 Hz, 3 shims, 0.375 gpm) Run 42 | 74.5 | 0.49 | 1.91 | 1100 | 505 | 2.9 @ 1100 rpm |
| (Evaporated | | | | | | |

TABLE 3A-continued 60 kW-hr/ton Evaporation Experiments

| Sample: (Description)/ Run# | wt % Solids | Sedigraph M.P.S., μm | 75/25 Slope | Brookfield Visc. @ 20 rpm, cps | Brookfield Visc. @ 100 rpm, cps | Hercules Visc. A bob @ 1100 rpm, dynes |
|---|---|---|---|---|---|---|
| Control at 74.5% solids then passed through rotor/stator Mixer) (rotor/stator Mixer Conditions: 60 Hz, No shims, 0.55 gpm) Run 43 | 74.5 | 0.50 | 1.89 | 1040 | 540 | 6.0 @ 1100 rpm |
| (60 kW-hr/ton Feed that is Evap. with rotor/stator in line during Evaporation) (rotor/stator Mixer Conditions: 60 Hz, No shims, 0.55 gpm) Run 44 | 75.31 | 0.52 | 1.92 | 974 | 362 | 18+ @ 935 rpm |
| (Run 44 with Solids cut to 74.0% for comparison to Run 39) Run 45 | 73.90 | 0.52 | 1.92 | 832 | 349 | 5.9 @ 1100 rpm |

Next, the 40 kW-hr/ton milled PCC material was used as feed to the rotor/stator mixer and evaporator system 800. Table 3B lists the run conditions and resulting Brookfield and Hercules viscosities for the 40 kW-hr/ton experiments. The control sample, Run 47, without the use of the rotor/stator mixer could only be raised to 73.8 wt % solids, before the evaporator recirculation pump failed. The Hercules viscosity using the A-bob at 73.8 wt % solids was 18+ dynes at 110 rpm. The solids content of a portion of this material was cut to 73 wt %, for later comparison. The Hercules viscosity of this material was 18+ dynes at 150 rpm. The 40 kW-hr/ton material was then evaporated with the use of the rotor/stator mixer. Again, slurry flow was not diverted through the mixer until the evaporator solids had reached roughly 65 wt %. The rotor/stator was again set at 60 Hz, with no shims, and at 0.55 gpm. The slurry reached a solids level of 73.7 wt % before the evaporator recirculation pump failed again. The Hercules viscosity of this material was 18+ dynes at 135 rpm. This sample was then diluted to 73 wt % solids, for comparison with Run 48, but the Hercules only improved from 18+ dynes at 150 rpm to 18+ dynes at 275 rpm. It was believed that the slurry had not circulated through the rotor/stator mixer long enough to affect the high-shear viscosity. For this reason, the slurry that had been cut to 73 wt % solids was then re-passed through the rotor/stator mixer only, at 60 Hz, with no shims, and at a flow rate of 0.55 gpm. This subsequently reduced the Hercules viscosity down to 2.9 dynes at 1100 rpm. In post processing the PCC slurry feed which had been media milled under the lower energy conditions (i.e., at 40 kW-hr/ton rather than 60 kW-hr/ton), the rotor/stator mixer was noted to reduce the PCC's median particle size slightly, but actually improved the resultant 75/25 slope slightly.

TABLE 3B 40 kW-hr/ton Evaporation Experiments

| Sample: (Description/ Run#) | % Solids | Sedigraph M.P.S., μm | 75/25 Slope | Brookfield Visc. @ 20 rpm, cps | BF Visc. @ 100 rpm, cps | Hercules Visc. A bob @ 1100 rpm, dynes |
|---|---|---|---|---|---|---|
| PCC Feed slurry Run 46 Evaporated Control (No rotor/stator Mixer) | 49.27 | 0.59 | 1.95 | — | — | — |

TABLE 3B-continued 40 kW-hr/ton Evaporation Experiments

| Sample:<br>(Description/<br>Run#) | % Solids | Sedigraph<br>M.P.S.,<br>μm | 75/25 Slope | Brookfield Visc.<br>@ 20 rpm,<br>cps | BF Visc.<br>@ 100 rpm,<br>cps | Hercules Visc.<br>A bob @ 1100 rpm,<br>dynes |
|---|---|---|---|---|---|---|
| Run 47 | 73.8 | 0.57 | 1.90 | 1684 | 665 | 18+ @ 110 rpm |
| Evaporated Control - Run 47 w/Solids cut to 73% | | | | | | |
| Run 48 | 72.99 | 0.53 | 1.95 | 1268 | 518 | 18+ @ 150 rpm |
| 40 kW-hr/ton Mat'l Evap. with rotor/stator in line during Evaporation rotor/stator Mixer conditions: 60 Hz, No shims, 0.55 gpm | | | | | | |
| Run 49 | 73.7 | 0.55 | 1.92 | 1228 | 470 | 18+ @ 135 rpm |
| Run 49 with Solids cut to 73.0% for comparison to Run 48 | | | | | | |
| Run 50 | 72.91 | 0.55 | 1.92 | 1080 | 396 | 18+ @ 275 rpm |
| Run 50 then re-passed through the rotor/stator Mixer rotor/stator Mixer conditions: 60 Hz, No shims, 0.25 gpm | | | | | | |
| Run 51 | 73.03 | 0.52 | 1.86 | 680 | 259 | 2.9 @ 1100 rpm |

In summary, the rotor/stator high shear in-line mixer was found to deliver some significant improvements in high shear Hercules viscosity to the PCC coating grade slurry while causing at worst only a minor reduction in the product's median particle size. For example, when using the 60 kW-hr/ton PCC feed, the practical slurry solids limit via normal evaporation was about 74% solids with an accompanying Hercules viscosity of 18+ @ 200 rpm (A-bob/1100). In comparison, the slurry solids from the same PCC feed was raised to 75.3% given the use of the rotor/stator mixer in-line during evaporation and the resultant Hercules viscosity at that higher solids was a very reasonable 18 + @ 935 rpm (A-bob/1100). This testing indicates that the in-line rotor/stator mixer could be used to significantly improve the high shear rheology of the coating PCC slurries, either in the absence of an evaporator or in conjunction therewith while minimizing any deleterious effects on particle size properties.

Additional experimental studies:

To study the Theological stability of PCC slurries that have been conditioned using the in-line rotor/stator mixer per this aspect of the present invention, additional experimental studies were carried out as follows. The PCC coating slurry product used for these studies was prepared and milled using media milling at 60 kW-hr/ton to one of the batches described above in this example. It was then evaporated while applying the rotor/stator in-line mixer during the evaporation step, in the manner and scheme as described above.

The initial PCC Slurry viscosities at 75.31 wt % solids were:

BF Visc. (20 rpm)=974 cps; Hercules Visc. (A-Bob)=18+/935 rpm.

Upon aging, the viscosities for this same PCC slurry sample (aged completely static-no mixing) for 4 weeks in a sealed jar were found to be the following at 75.31 wt % solids:

BF Visc. (20 rpm)=980 cps; Hercules Visc. (A-Bob)=18+/660 rpm.

As a comparative example, the original PCC control slurry, which was not subjected to the rotor/stator mixer during evaporation, could only be evaporated to 74.5 wt % solids and had the following initial viscosities:

BF Visc. (20 rpm)=1280 cps; Hercules Visc. (A-Bob)= 18+/90 rpm

The Hercules high shear viscosity benefits derived from processing the PCC slurry through the rotor/stator mixer were persistent and appeared to deteriorate only nominally upon long term standing. The resultant viscosities measured after 4 weeks were significantly better than those of the untreated, control PCC slurry (i.e., no rotor/stator mixing). Essentially no change in Brookfield Viscosity was observed over this 4 week time period for the PCC slurry processed with the rotor/stator mixer according to the present invention.

To confirm the results of these preliminary aging studies, additional tests were made on the rheological stability of PCC slurries that were conditioned using the in-line rotor/ stator mixer per this aspect of the present invention. The PCC coating slurry products (72.5 wt % solids) used for these studies were prepared and milled using media milling at 60 kW-hr/ton in a manner similar to those as described above in this example. The viscosity properties of the high shear mixed PCC slurries were measured at one week, at two weeks, and after one month. The test slurries were prepared by applying the rotor/stator in-line mixer during the evaporation step, in the manner as described above. The tests and results are summarized in Table 4 below.

In another set of separate experiments, the rotor/stator type mixer was used separately, and not in conjunction with any dewatering evaporator, on a high solids PCC slurry product corresponding to a PCC coating product 11 as produced by the PCC processing equipment arrangement of FIG. 1, to determine if the Hercules viscosity of that PCC slurry product could be reduced and thereby improved with all other things kept constant. The high shear viscosity was improved in the slurries processed in this manner. Alternatively, and although not done in the experiments

TABLE 4

|  | (Time = 0) | (Time = 1 wk) | (Time = 2 wks) | (Time = 1 month) |
|---|---|---|---|---|
| Run 52 Control |  |  |  |  |
| Brookfield 20 rpm: | 776 cps | 812 | 840 | 910 |
| Brookfield 100 rpm: | 286 cps | 300 | 306 | 338 |
| Hercules @ 1100 rpm: | 18+ @ 440 rpm | 18+ @ 245 rpm | 18+ @ 495 rpm | 18+ @ 330 rpm |
| Slurry pH: | 9.1 | 9.1 | 9.15 | 9.2 |
| Oven Solids: | 72.65% | 72.57 | 72.53 | 72.89 |
| Sedigraph M.P.S. | 0.45 μm | — | — | — |
| Sedigraph 75/25 slope: | 1.64 | — | — | — |
| Run 58 rotor/stator Mixer @ % gpm, 50 Hz |  |  |  |  |
| Brookfield 20 rpm: | 716 cps | 780 | 846 | 868 |
| Brookfield 100 rpm: | 248 cps | 271 | 299 | 308 |
| Hercules @ 1100 rpm: | 2.11 @ 1100 rpm | 2.04 @ 1100 rpm | 2.07 @ 1100 rpm | 2.18 @ 1100 rpm |
| Slurry pH: | 9.3 | 9.3 | 9.3 | 9.3 |
| Oven Solids: | 72.97% | 72.87 | 72.98 | 73.05 |
| Sedigraph M.P.S. | 0.42 μm | — | — | — |
| Sedigraph 75/25 slope: | 1.68 | — | — | — |
| Run 54 rotor/stator Mixer @ 1/4 gpm, 60 Hz |  |  |  |  |
| Brookfield 20 rpm: | 652 cps | 708 | 740 | 800 |
| Brookfield 100 rpm: | 226 cps | 246 | 258 | 276 |
| Hercules @ 1100 rpm: | 1.96 @ 1100 rpm | 1.94 @ 1100 rpm | 1.89 @ 1100 rpm | 2.18 @ 1100 rpm |
| Slurry pH: | 9.3 | 9.3 | 9.3 | 9.3 |
| Oven Solids: | 72.58% | 72.59 | 72.56 | 72.71 |
| Sedigraph M.P.S. | 0.42 μm | — | — | — |
| Sedigraph 75/25 slope: | 1.68 | — | — | — |
| Run 55 rotor/stator Mixer @ 1/4 gpm, 60 Hz, 2 passes |  |  |  |  |
| Brookfield 20 rpm: | 712 cps | 768 | 780 | 848 |
| Brookfield 100 rpm: | 243 cps | 262 | 270 | 298 |
| Hercules @ 1100 rpm: | 2.02 @ 1100 rpm | 1.92 @ 1100 rpm | 1.89 @ 1100 rpm | 2.09 @ 1100 rpm |
| Slurry pH: | 9.3 | 9.3 | 9.3 | 9.3 |
| Oven Solids: | 72.73% | 72.67 | 72.74 | 72.82 |
| Sedigraph M.P.S. | 0.42 μm | — | — | — |
| Sedigraph 75/25 slope: | 1.68 | — | — | — |
| Run 56 rotor/stator Mixer @ 1/2 gpm, 60 Hz |  |  |  |  |
| Brookfield 20 rpm: | 660 cps | 712 | 748 | 800 |
| Brookfield 100 rpm: | 232 cps | 249 | 258 | 286 |
| Hercules @ 1100 rpm: | 1.97 @ 1100 rpm | 1.97 @ 1100 rpm | 1.96 @ 1100 rpm | 2.13 @ 1100 rpm |
| Slurry pH: | 9.3 | 9.3 | 9.3 | 9.3 |
| Oven Solids: | 72.63% | 72.61 | 72.62 | 72.74 |
| Sedigraph M.P.S. | 0.43 μm | — | — | — |
| Sedigraph 75/25 slope: | 1.62 | — | — | — |
| Run 57 rotor/stator Mixer @ 3/4 gpm, 60 Hz* |  |  |  |  |
| Brookfield 20 rpm: | 664 cps | 720 | 752 | 810 |
| Brookfield 100 rpm: | 234 cps | 250 | 258 | 285 |
| Hercules @ 1100 rpm: | 1.94 @ 1100 rpm | 1.91 @ 1100 rpm | 1.96 @ 1100 rpm | 2.03 @ 1100 rpm |
| Slurry pH: | 9.3 | 9.3 | 9.3 | 9.3 |
| Oven Solids: | 72.63% | 72.54 | 72.61 | 72.73 |
| Sedigraph M.P.S. | 0.43 μm | — | — | — |
| Sedigraph 75/25 slope: | 1.67 | — | — | — |

*= 3/4 gpm not feasible as breaker tripped

TABLE 5 rotor/stator Mixer Study for Scalenohedral PCC: CS-40

| rotor/stator Mixer Expt: | rotor/stator Gap | Sedigraph M.P.S., $\mu$m | 75/25 Slope | BET, $m^2$g |
|---|---|---|---|---|
| CS-40 Control | | 0.5 | 2.44 | 12.01 |
| CS-40 0.50 GPM | 0.030" | 0.48 | 2.47 | 11.96 |

| Sample ID | rotor/stator Gap | % Motor Load | Solids, % | BF @ 20 RPM, cps | BF @ 100 RPM, cps | Hercules @ 1100 RPM, dynes | Hercules @ 4400 RPM, dynes |
|---|---|---|---|---|---|---|---|
| CS-40 Control (Run 58) | | | 72.34 | 317 | 194 | 5.1 | 72/1775 |
| CS-40 0.25 GPM (Run 59) | 0.030" | 70 | 72.21 | 370 | 212 | 2.5 | 49 |
| CS-40 0.50 GPM (Run 60) | 0.030" | 101 | 72.24 | 372 | 220 | 2.4 | 40 | outlet side of the evaporator unit in the processing scheme otherwise as shown in FIG. 1, without recirculating the sheared slurry fraction back into the evaporator per the inventive embodiment shown in FIG. 8, such that standard slurry evaporation can be modified to incorporate the high-shear mixing step per this invention as one continuous flow-through process, as opposed to a batch unit operation as illustrated in FIG. 8.

EXAMPLE IV

In contrast to using an ultrafine particle, rhombohedral-based PCC coating pigment in the slurry evaporation and rotor/stator high-shear conditioning experiments of Example III, this experiment examined the benefits of post-processing an ultrafine particle scalenohedral-based PCC coating pigment, namely a commercial PCC product "CS-40", produced by the J. M. Huber Corporation in Hermalle, Belgium. The particle size and BET surface area properties of the CS-40 control product are summarized below in Table 5. A 72.34 wt % solids slurry of CS-40 was produced by a conventional PCC slurry process as previously described in accordance with FIG. 1. The Brookfield and Hercules viscosity properties of this finished product slurry were determined and have been recorded in Table 5 as Run 58. In the experiments of this Example IV, the Hercules high shear viscosity was not only measured using the standard A-bob at 1100 rpm but also measured using the alternative E-bob at 4400 rpm. The E-bob/4400 rpm measurement yielded viscosity information that corresponds to a much higher level of applied shear than the A-bob/1100 rpm measurement (45,848 sec$^{-1}$ versus 4554 sec$^{-1}$, respectively, at their maximum shear rates). The CS-40 control slurry was then passed through the rotor/stator type in-line, high shear mixer (same as the one identified in Example III herein) at slurry feed rates of 0.25 gpm (Run 59) and 0.50 gpm (Run 60) using 3 shims (which corresponds to a gap opening of 0.030"). At both slurry feed rates, significant improvements in Hercules viscosity (A or E bob) were achieved while almost negligible effects were observed on the scalenohedral PCC's median particle size, 75/25 slope value, and BET surface area properties. This data in combination with the previous data of Example III clearly demonstrate that the rheological benefits of using the rotor/stator type in-line, high shear mixer are not limited to a particular PCC particle morphology type.

EXAMPLE V

In this example, the processing benefits derived from employing the rotor/stator in-line mixer on a rhombohedral-based PCC coating pigment slurry having a coarser median particle size (about 0.8 $\mu$m) was examined. The rotor/stator mixer used for the studies reported in Example III was also used for these additional studies. This rhombohedral PCC coating product was obtained as a commercially sold product under the name "CR-80", manufactured by the J. M. Huber Corporation in Hermalle, Belgium. The particle size and BET surface area properties of the CR-80 control are summarized below in Table 6. In comparison, the ultrafine rhombohedral-based PCC coating pigments previously tested with the rotor/stator mixer in Example III had a median particle size of about 0.55 $\mu$m.

A 72.23 wt % solids slurry of CR-80 was produced by a conventional PCC slurry process as previously described in accordance with FIG. 1. The Brookfield and Hercules viscosity properties of this finished product slurry were determined and have been recorded in Table 6 as Run 61. The Hercules high shear viscosity was again not only measured using the standard A-bob at 1100 rpm but with the E-bob at 4400 rpm as well. The CR-80 control slurry was then passed through the rotor/stator in-line, high shear mixer at slurry feed rates of 0.25 gpm (Run 62) and 0.50 gpm (Run 63) using 3 shims (which corresponds to a gap opening of 0.030"). At both slurry feed rates, significant improvements in Hercules viscosity (A or E bob) were achieved while almost negligible effects were observed on the rhombohedral PCC's median particle size, 75/25 slope value, and BET surface area properties. This data in combination with the previous data of Example III clearly demonstrated that the Theological benefits of using the rotor/stator in-line high shear mixer are not limited to a particular rhombohedral PCC particle size.

TABLE 6 rotor/stator Mixer Study for
Rhombohedral PCC: CR80

| rotor/stator Mixer Expt: | rotor/stator Gap | Sedigraph M.P.S. µm | 75/25 Slope | BET, m²/g |
|---|---|---|---|---|
| CR-80 Control | | 0.83 | 2.00 | 6.89 |
| CR-80 0.50 GPM | 0.030" | 0.80 | 1.96 | 6.97 |

| Sample ID | rotor/stator Gap | % Motor Load | Solids, % | BF @ 20 RPM, cps | BF @ 100 RPM, cps | Hercules @ 1100 RPM, dynes | Hercules @ 4400 RPM, dynes |
|---|---|---|---|---|---|---|---|
| CR-80 Control (Run 61) | | | 72.23 | 243 | 162 | 9.5 | 72+ @ 850 rpm |
| CR-80 0.25 GPM (Run 62) | 0.030" | 64 | 72.12 | 160 | 114 | 1.5 | 48 |
| CR-80 0.50 GPM (Run 63) | 0.030" | 94 | 72.24 | 230 | 139 | 2.3 | 72+ @ 2300 rpm |

The present invention may be embodied in other specific forms without departing from the spirit or essential attributes thereof and accordingly reference should be made to the appended claims rather than the foregoing specification as indicating the scope of the invention.

What is claimed is:

1. A process for the preparation of a precipitated calcium carbonate (PCC) composition, comprising the steps of wet grinding an aqueous slurry of PCC, said grinding being done in a plurality of separate grinding stages; partially dewatering said ground PCC slurry in the presence of an organic dispersant in a solid bowl centrifuge; and subjecting said centrifuged PCC slurry in the presence of an organic dispersant to fluid shearing forces in a rotor and stator mixer.

2. A process for the preparation of an aqueous slurry of precipitated calcium carbonate (PCC) suitable for paper coating compositions, comprising:

(a) providing a PCC slurry comprising an aqueous suspension of precipitated calcium carbonate formed by carbonation of lime milk;

(b) wet grinding the PCC slurry in a plurality of separate grinding stages effective to produce a ground slurry comprising PCC particles having a 75/25 slope value of not more than approximately 1.8 and a median particle size of between approximately 0.25 to 2.0 µm, said grinding being carried out on a slurry that is essentially free of the presence of organic dispersant;

(c) adding an organic dispersant to said ground PCC slurry;

(d) centrifuging said ground, dispersed PCC slurry in a solid bowl centrifuge effective to partially dewater said PCC slurry so as to obtain a filtered PCC slurry having a solids content of at least about 65 wt %;

(e) adding an organic dispersant to said partially-dewatered PCC slurry to provide a dispersed partially dewatered PCC slurry having a shear viscosity; and (f) subjecting said dispersed partially dewatered PCC slurry to fluid shearing forces in an in-line mixer comprising a rotor and stator mixer effective to reduce the shear viscosity of said dispersed partially dewatered PCC slurry.

3. A process for the preparation of an aqueous slurry of precipitated calcium carbonate (PCC) suitable for paper coating compositions, comprising the steps of:

(a) precipitating calcium carbonate by carbonating an aqueous slurry of calcium hydroxide to produce a PCC slurry comprised of an aqueous. suspension of PCC predominantly in calcite crystal form;

(b) wet grinding the PCC slurry in a plurality of separate grinding stages effective to produce a ground slurry comprising PCC particles having a 75/25 slope value of not more than approximately 1.8, and a median particle size of between approximately 0.25 to 2.0 µm, said grinding being carried out on a slurry that is essentially free of the presence of organic dispersant;

(c) adding an organic dispersant with mixing to said ground PCC slurry, where the ground PCC slurry has a solids content less than approximately 25 wt %;

(d) centrifuging said ground PCC slurry in a solid bowl centrifuge effective to partially dewater said slurry to obtain a filtered PCC slurry having a solids content of at least about 65 wt %;

(e) adding an organic dispersant with mixing to said partially dewatered slurry to provide a dispersed partially dewatered PCC slurry having a Hercules shear viscosity; and (f) subjecting said PCC slurry to fluid shearing forces in an in-line rotor and stationary stator mixer effective to reduce the Hercules shear viscosity of said dispersed partially dewatered slurry while maintaining the slope of the PCC within 5% of that present at the completion of step (b).

4. The process of claim 3, wherein the PCC provided in step (a) has a 75/25 slope value >2.0.

5. The process of claim 3, wherein the PCC predominantly in calcite crystal form is formed as aggregates of the PCC crystals.

6. The process of claim 3, further comprising the additional steps of: (g) adding said sheared PCC slurry to a paper coating formulation; and (h) coating at least one side of a paper base stock with said paper coating composition.

7. The process of claim 6, further comprising the additional step of using said sheared PCC slurry in a paper coating formulation, with the proviso that, immediately after step (d) and up until the paper coating step, the PCC slurry is maintained such that total evaporative loss of water from the PCC slurry is less than 5 wt % of water present in the PCC slurry upon completion of step (d).

8. The process of claim 3, wherein said partially dewatered PCC slurry obtained from step (d) has a solids content of between approximately 72 to approximately 80 wt %.

9. The process of claim 3, wherein said ground PCC slurry has a solids content of approximately 16 to 22 wt %.

10. The process of claim 3, wherein said step (f) comprises subjecting the PCC as a pumpable slurry, to fluid shear forces in the rotor and stator mixer by passing said PCC slurry through a narrow gap across which a pressure differential is maintained, where said narrow gap being defined between the rotor and the stationary stator wherein said stator vertically surrounds the rotor, said rotor being rotated with respect to said stationary stator, and said PCC slurry being subjected to said shearing forces in at least the said narrow gap between said stator and rotor.

11. The process of claim 3, wherein the PCC predominantly in calcite crystal form has a shape selected from rhombohedral shape or scalenohedral shape.

12. The process of claim 3, wherein the PCC predominantly in calcite crystal form has a rhombohedral shape.

13. The process of claim 3, wherein the ground PCC slurry obtained in step (b) has a 75/25 slope value of not more than approximately 1.75.

14. The process of claim 3, wherein the centrifuge used in step (d) comprises a Bird solid bowl centrifuge.

15. The process of claim 3, wherein the wet grinding in step (b) is performed by making multiple passes of the PCC slurry through a horizontal media mill.

16. The process of claim 3, wherein the wet grinding in step (b) is performed by making multiple passes of the PCC slurry through a vertical media mill.

17. An aqueous slurry useful for paper coating comprising an aqueous suspension of precipitated calcium carbonate (PCC) particles, wherein the PCC particles comprise at least 50% by weight PCC crystals having rhombohedral shaped crystal form, and the PCC particles comprise a 75/25 slope value of not more than approximately 1.8 and a median particle size of between approximately 0.25 to 2.0 $\mu$m, and said slurry having a Hercules shear viscosity of +18 dynes at $\geq$500 rpm (A-bob/1100) or $\leq$18 dynes at 1100 rpm (A-bob/1100).

18. An aqueous slurry according to claim 17 having a PCC particle content of at least 65 wt %.

19. An aqueous slurry according to claim 17 having a PCC particle content between 70–80 wt %.

20. An aqueous slurry according to claim 17 having a solids content of at least approximately 72 wt %.

21. An aqueous slurry according to claim 17 wherein the PCC slurry has a 75/25 slope value of not more than approximately 1.75.

22. An aqueous slurry according to claim 17 wherein the PCC slurry has a 75/25 slope value of between 1.6 to 1.7.

23. An aqueous slurry according to claim 17 wherein the PCC particles comprise a median particle size of between approximately 0.5 to 1.0 $\mu$m.

* * * * *